(12) United States Patent
Zhang et al.

(10) Patent No.: US 11,853,704 B2
(45) Date of Patent: Dec. 26, 2023

(54) CLASSIFICATION MODEL TRAINING METHOD, CLASSIFICATION METHOD, DEVICE, AND MEDIUM

(71) Applicant: Tencent Technology (Shenzhen) Company Limited, Shenzhen (CN)

(72) Inventors: Haisong Zhang, Shenzhen (CN); Yan Song, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 377 days.

(21) Appl. No.: 17/214,665

(22) Filed: Mar. 26, 2021

(65) Prior Publication Data

US 2021/0216723 A1 Jul. 15, 2021

Related U.S. Application Data

(63) Continuation of application No. PCT/CN2019/123496, filed on Dec. 6, 2019.

(30) Foreign Application Priority Data

Dec. 18, 2018 (CN) .................. 201811554820.X

(51) Int. Cl.
 *G06F 40/30* (2020.01)
 *G06F 18/241* (2023.01)
(52) U.S. Cl.
 CPC ............ *G06F 40/30* (2020.01); *G06F 18/241* (2023.01)
(58) Field of Classification Search
 CPC ............................... G06F 40/30; G06F 18/241
 See application file for complete search history.

(56) References Cited

U.S. PATENT DOCUMENTS 10,788,900 B1 * 9/2020 Brendel .................. G06F 40/53
2015/0081279 A1 3/2015 Suleman et al.
(Continued)

FOREIGN PATENT DOCUMENTS

CN 107515855 A 12/2017
CN 107832663 A 3/2018
(Continued)

OTHER PUBLICATIONS

Tencent Technology, ISR, PCT/CN2019/123496, Mar. 12, 2020, 2 pgs.

(Continued)

*Primary Examiner* — Kevin Ky
(74) *Attorney, Agent, or Firm* — Morgan, Lewis & Bockius LLP

(57) ABSTRACT

Embodiments of this application disclose a classification model training method, a classification method, a device, and a medium. An initial classification model is first trained by using a first sample set including a large quantity of first samples, to obtain a pre-trained model, each first sample including a social text and an emoticon label corresponding to the social text; and the pre-trained model is then trained by using a second sample set including a small quantity of second samples, to obtain a social text sentiment classification model that uses a social text as an input and use a sentiment class probability distribution corresponding to the social text as an output. In this method, the model is trained by combining a large quantity of weakly supervised samples with a small quantity of supervised samples, to ensure that the model obtained through training has better model performance without increasing manually labeled samples.

20 Claims, 12 Drawing Sheets

(56) References Cited

U.S. PATENT DOCUMENTS

| | | |
|---|---|---|
| 2016/0267377 A1 | 9/2016 | Pan et al. |
| 2017/0052946 A1 | 2/2017 | Gu et al. |
| 2017/0075991 A1* | 3/2017 | Kataria .................... G06N 7/01 |
| 2017/0083825 A1* | 3/2017 | Battersby ................ G06N 20/00 |
| 2018/0068231 A1* | 3/2018 | Sharma ................... G06F 16/35 |
| 2019/0026786 A1* | 1/2019 | Khoury .............. G06Q 30/0271 |
| 2019/0122403 A1* | 4/2019 | Woo ....................... G06V 10/44 |

FOREIGN PATENT DOCUMENTS

| | | |
|---|---|---|
| CN | 108509596 A | 9/2018 |
| CN | 108536870 A | 9/2018 |
| CN | 108681532 A | 10/2018 |
| CN | 109684478 A | 4/2019 |
| JP | 2010092352 A | 4/2010 |

OTHER PUBLICATIONS

Tencent Technology, WO, PCT/CN2019/123496, Mar. 12, 2020, 5 pgs.
Tencent Technology, IPRP, PCT/CN2019/123496, Jun. 16, 2021, 6 pgs.

* cited by examiner

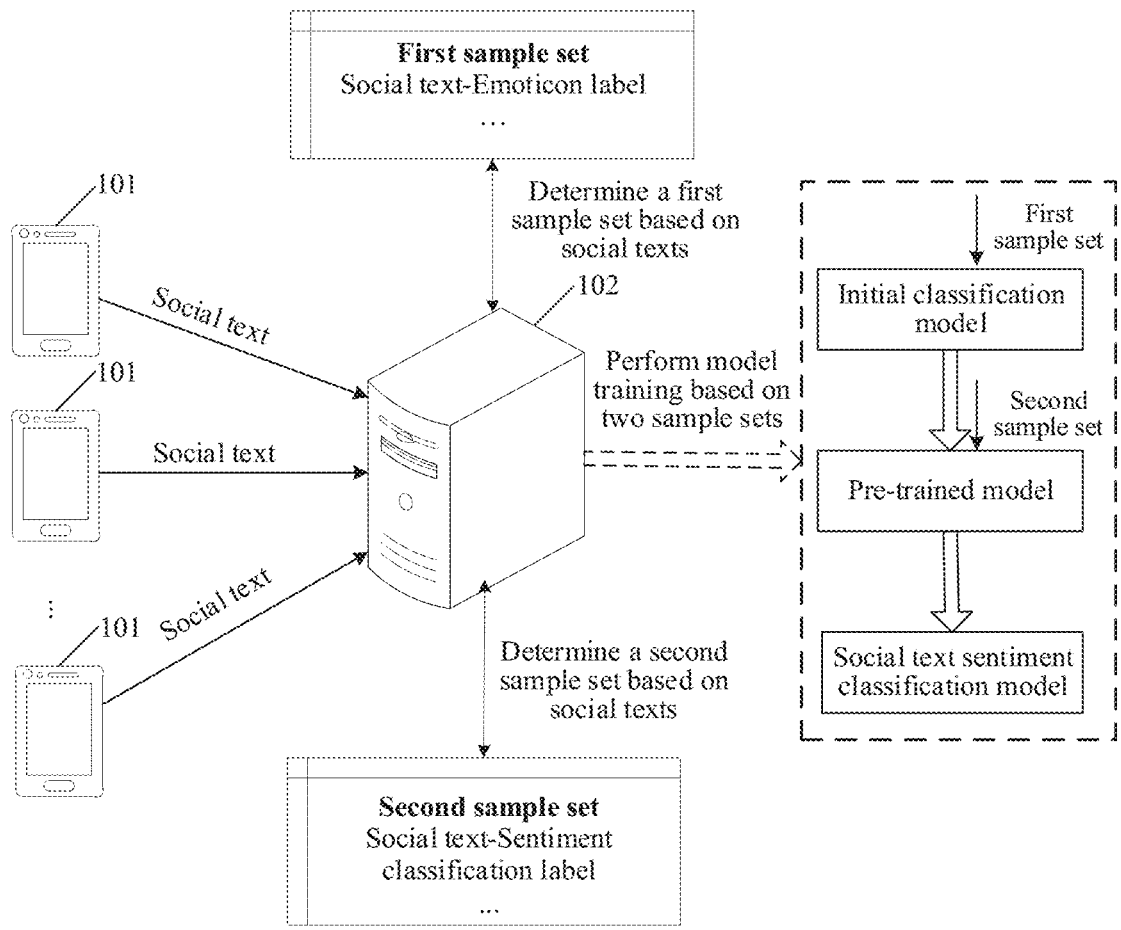

FIG. 1

A server trains an initial classification model by using first samples, to obtain a pre-trained model, the first sample set including first samples, the first sample including a social text and an emoticon label corresponding to the social text — 201

The server trains the pre-trained model by using a second sample set, to obtain a social text sentiment classification model, the social text sentiment classification model using a social text as an input and using a sentiment class probability distribution corresponding to the social text as an output, the second sample set including second samples, the second sample including a social text and a sentiment classification label corresponding to the social text — 202

FIG. 2

CLASSIFICATION MODEL TRAINING METHOD, CLASSIFICATION METHOD, DEVICE, AND MEDIUM

CROSS REFERENCE TO RELATED APPLICATIONS

This application is a continuation application of PCT Patent Application No. PCT/CN2019/123496, entitled "CLASSIFICATION MODEL TRAINING METHOD, CLASSIFICATION METHOD, DEVICE AND MEDIUM" filed on Dec. 6, 2019, which claims priority to Chinese Patent Application No. 201811554820.X, filed with the State Intellectual Property Office of the People's Republic of China on Dec. 18, 2018, and entitled "CLASSIFICATION MODEL TRAINING METHOD, CLASSIFICATION METHOD AND APPARATUS, DEVICE, AND MEDIUM", all of which are incorporated herein by reference in their entirety.

FIELD OF THE TECHNOLOGY

This application relates to the field of machine learning technologies, and in particular, to a classification model training method, a classification method, a device, and a medium.

BACKGROUND OF THE DISCLOSURE

Currently, sentiment classification of a social text plays an important role in many products. For example, all products such as public opinion analysis, product marketing, and a chat robot rely on a social text sentiment classification model to implement sentiment classification of the social text, so as to implement corresponding product functions based on sentiment classification results. The performance of such products depends on the performance of the social text sentiment classification model.

A related social text sentiment classification model relies on supervised learning and a set of manually labeled samples, and the performance of the model depends on the quality of the manually labeled samples and a sample quantity. A high-performance social text sentiment classification model can only be trained based on large-scale high-quality sample data. However, high costs of manual labeling limit the augmentation of high-quality sample data, and an insufficient labeling quantity affects the performance of the model.

Therefore, the current model training method is limited by the quantity of labeled samples. As a result, the performance of the text sentiment classification model is not high, and it is difficult to meet performance requirements of the foregoing products.

SUMMARY

Embodiments of this application provide a classification model training method, a classification method, a device, and a medium, so as to ensure that a social text sentiment classification model with better performance is obtained through training without increasing manually labeled samples.

In view of this, a first aspect of this application provides a classification model training method performed at a computing device having one or more processors and memory storing a plurality of computer-readable instructions to be executed by the one or more processors, the method including:

training an initial classification model by using a first sample set, to obtain a pre-trained model, the first sample set including first samples, the first sample including a social text and an emoticon label corresponding to the social text; and training the pre-trained model by using a second sample set, to obtain a social text sentiment classification model, the second sample set comprising second samples, the second sample comprising a social text and a sentiment classification label corresponding to the social text; and applying a social text to the social text sentiment classification model as an input to obtain a sentiment class probability distribution corresponding to the social text as an output.

A second aspect of this application provides a computing device, including a processor and a memory, the memory being configured to store a plurality of computer-readable instructions; and the processor being configured to perform a plurality of operations according to the plurality of computer-readable instructions, the plurality of operations including:

training an initial classification model by using a first sample set, to obtain a pre-trained model, the first sample set comprising first samples, the first sample comprising a social text and an emoticon label corresponding to the social text;

training the pre-trained model by using a second sample set, to obtain a social text sentiment classification model, the second sample set comprising second samples, the second sample comprising a social text and a sentiment classification label corresponding to the social text; and applying a social text to the social text sentiment classification model as an input to obtain a sentiment class probability distribution corresponding to the social text as an output.

Alternatively, the processor is configured to perform the following classification operations according to instructions in the program code:

obtaining a social text:

obtaining a sentiment class probability distribution corresponding to the social text according to the social text by using a social text sentiment classification model, the social text sentiment classification model being obtained through training using the classification model training method according to any of claims 1 to 6; and determining a sentiment class of the social text according to the sentiment class probability distribution corresponding to the social text.

A third aspect of this application provides a non-transitory computer-readable storage medium storing a plurality of computer-readable instructions that, when executed by a processor of a computing device, cause the computing device to perform a plurality of operations including:

training an initial classification model by using a first sample set, to obtain a pre-trained model, the first sample set comprising first samples, the first sample comprising a social text and an emoticon label corresponding to the social text;

training the pre-trained model by using a second sample set, to obtain a social text sentiment classification model, the second sample set comprising second samples, the second sample comprising a social text and a sentiment classification label corresponding to the social text; and applying a social text to the social text sentiment classification model as an input to obtain a sentiment class probability distribution corresponding to the social text as an output.

Alternatively, the program code is configured to perform the following classification model training operations:

obtaining a social text;

obtaining a sentiment class probability distribution corresponding to the social text according to the social text by using a social text sentiment classification model, the social text sentiment classification model being obtained through training using the classification model training method according to any of claims 1 to 6; and determining a sentiment class of the social text according to the sentiment class probability distribution corresponding to the social text.

According to the foregoing technical solutions, it can be learned that the embodiments of this application have the following advantages:

The embodiments of this application provide a classification model training method. In this method, the initial classification model is trained by using the first sample set including a large quantity of weakly supervised samples, to obtain the pre-trained model. The weakly supervised sample herein is the first sample, and includes a social text and an emoticon label corresponding to the social text. By using such a characteristic that the emoticon carried in the social text can represent a sentiment classification of the social text to some extent, the emoticon carried in the social text is directly used as the sentiment classification label corresponding to the social text, and it is unnecessary to add a sample label manually. After the training of the pre-trained model is completed, further, the pre-trained model is further optimally trained by using the second sample set including a small quantity of supervised samples. The supervised sample herein is the second sample, and includes a social text and a manually-added sentiment classification label corresponding to the social text, so as to obtain the social text sentiment classification model that uses a social text as an input, and uses a sentiment class probability distribution corresponding to the social text as an output. In this way, the model is trained by combining a large quantity of weakly supervised samples with a small quantity of supervised samples, to ensure that the social text sentiment classification model with better model performance is trained without increasing costs of manual sample labeling, that is, trained by using a small quantity of manually labeled samples.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and persons of ordinary skill in the art may still derive other drawings from these accompanying drawings without creative efforts.

FIG. 1 is a schematic diagram of an application scenario of a classification model training method according to an embodiment of this application.

FIG. 2 is a schematic flowchart of a classification model training method according to an embodiment of this application.

DESCRIPTION OF EMBODIMENTS

Figure 3:
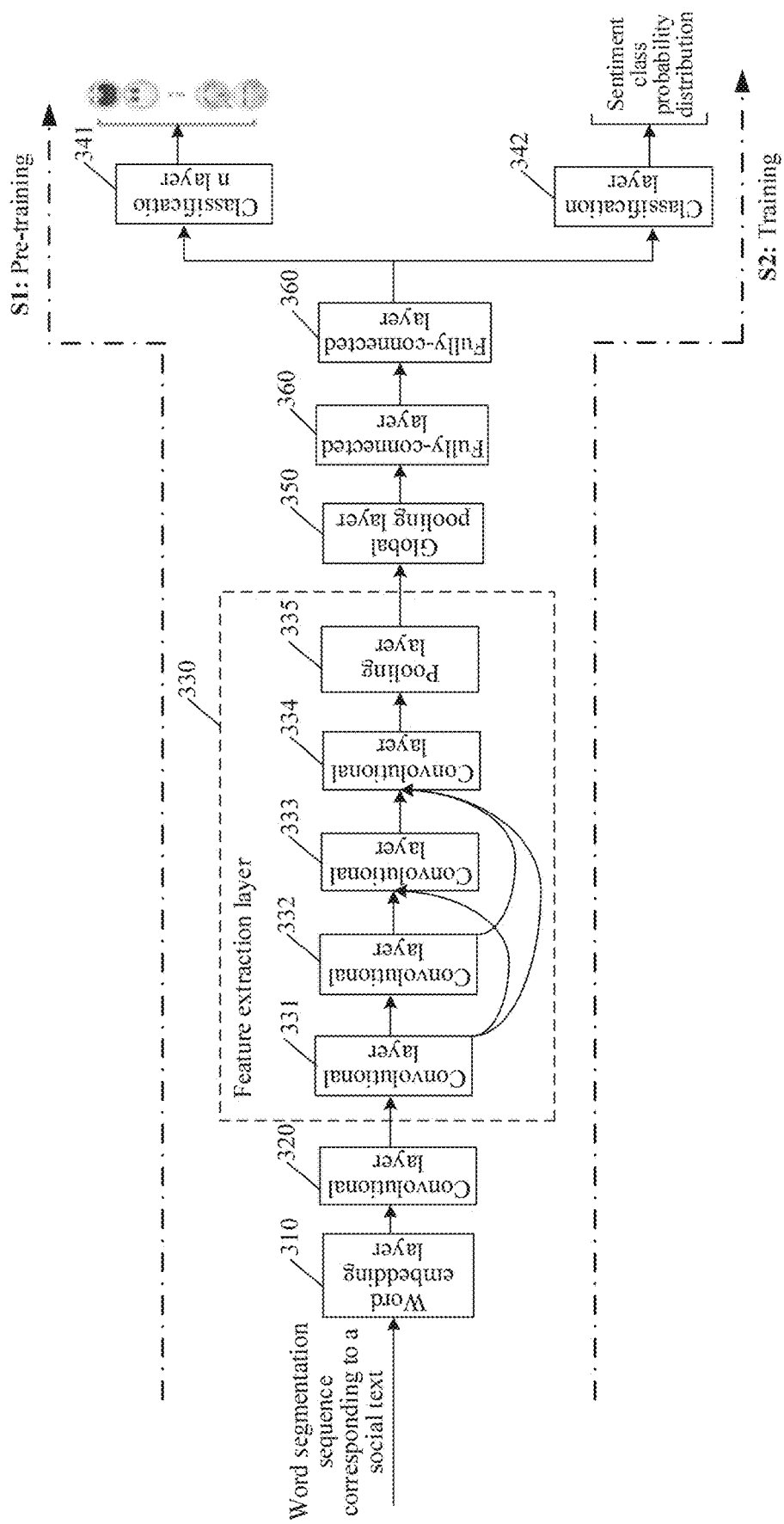
FIG. 3 is a schematic architectural diagram of a model training process according to an embodiment of this application.

To make persons skilled in the art understand solutions of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by persons of ordinary skill in the art based on the embodiments of this application without creative efforts fall within the protection scope of this application.

In the specification, claims, and accompanying drawings of this application, the terms "first", "second", "third", "fourth", and the like (if existing) are intended to distinguish between similar objects rather than describe a specific sequence or a precedence order. Data used in this way is interchangeable in a suitable case, so that the embodiments of this application described herein can be implemented in a sequence in addition to the sequence shown or described herein. Moreover, the terms "include", "have" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

In the related technology, during training of a social text sentiment classification model, supervised training is performed on the model by using manually labeled samples.

However, it is extremely expensive to label samples manually. With limited costs for model training, generally only a small quantity of manually labeled samples may be obtained. A model obtained through training using a small quantity of manually labeled samples generally has poor performance, and cannot meet requirements of practical application products in many cases.

To resolve the technical problem existing in the foregoing related technology, embodiments of this application provide a classification model training method. In this method, the classification model is trained by combining a large quantity of weakly supervised samples with a small quantity of supervised samples, to ensure that the social text sentiment classification model with better model performance is obtained through training without increasing manually labeled samples.

The classification model training method provided in the embodiments of this application may be applied to a device having a model training function, such as a terminal device or a server. The terminal device may be a smartphone, a computer, a personal digital assistant (PDA), a tablet computer, or the like. The server may be an application server, or may be a Web server. During actual application deployment, the server may be an independent server, or may be a cluster server.

In actual application, the terminal device and the server may train the classification model separately, or may train the classification model interactively with each other. When the terminal device and the server train the classification model interactively, the server may obtain social texts from the terminal device, generate first samples and second samples based on the obtained social texts, form a first sample set and a second sample set correspondingly, and further train the classification model by using the first sample set and the second sample set. Similarly, the terminal device may alternatively obtain social texts from the server, generate first samples and second samples based on the obtained social texts, form a first sample set and a second sample set correspondingly, and further train the classification model by using the first sample set and the second sample set.

After performing the classification model training method provided in the embodiments of this application, to obtain the social text sentiment classification model through training, the terminal device or the server may transmit the social text sentiment classification model to other terminal devices, so that the social text sentiment classification model is run on such terminal devices, to implement corresponding functions; or may transmit the social text sentiment classification model to other servers, so that the social text sentiment classification model is run on other servers, to implement corresponding functions by using such servers.

For ease of understanding of the technical solutions provided in the embodiments of this application, the following uses a server training classification model as an example, to describe the classification model training method provided in the embodiments of this application with reference to an actual application scenario.

FIG. 1 is a schematic diagram of an application scenario of a classification model training method according to an embodiment of this application. This application scenario includes several terminal devices 101 and a server 102 for training a neural network model. The terminal devices 101 and the server 102 may be connected through a network. The terminal devices 101 may provide the server 102 with social texts used for generating first samples and second samples.

As shown in FIG. 1, the server 102 may obtain the social texts from the terminal devices 101, and the obtained social texts include social texts with emoticons. Further, the server 102 may correspondingly process the social text with the emoticon, determine an emoticon label corresponding to the social text, then use the social text and the emoticon label corresponding to the social text as a first sample, and form a first sample set by using a large quantity of first samples. After acquiring the social texts, the server 102 provides the social texts for labeling workers, so that the acquired social texts are manually labeled based on a manual labeling manner, to obtain sentiment classification labels corresponding to the social texts. Further, the server 102 uses the social texts and the sentiment classification labels corresponding to the social texts as second samples, and forms a second sample set by using a small quantity of second samples.

Further, the server 102 trains a pre-constructed initial classification model by using the first samples in the first sample set, to obtain a pre-trained model, and then trains the pre-trained model by using the second samples in the second sample set, to obtain a social text sentiment classification model that can use a social text as an input and use a sentiment class probability distribution corresponding to the social text as an output.

The foregoing first sample set includes a large quantity of first samples, and the first samples are weakly supervised samples. By using such a characteristic that the emoticon carried in the social text can represent a sentiment classification of the social text to some extent, the emoticon carried in the social text is directly used as the sentiment classification label corresponding to the social text, and it is unnecessary to add a sample label manually. On the basis of obtaining the pre-trained model through training by using the first sample set, the pre-trained model is further optimally trained by using the second sample set, to obtain the social text sentiment classification model. The second sample set generally includes only a small quantity of second samples. The second samples are supervised samples, and include sentiment classification labels that are added manually. Secondary training is performed on the pre-trained model based on the supervised samples, to further ensure that the social text sentiment classification model obtained through training has better model performance.

The server 102 may alternatively obtain social texts in other manners. For example, the server obtains the social texts from a database or from other servers. Certainly, the server 102 may alternatively obtain the first sample set and the second sample set directly from other devices. The foregoing application scenario shown in FIG. 1 is only an example. In actual application, the classification model training method provided in the embodiments of this application may be alternatively applied to other application scenarios. The application scenario of the classification model training method is not limited herein.

The following describes, through embodiments, the classification model training method provided in this application.

FIG. 2 is a schematic flowchart of a classification model training method according to an embodiment of this application. For ease of description, in the following embodiments, description is made by using a server as an execution body. The execution body of the classification model training method is not limited to a server, and the method may alternatively be applied to a device having a model training function such as a terminal device. As shown in FIG. 2, the classification model training method includes the following steps:

Step 201. The server trains an initial classification model by using a first sample set, to obtain a pre-trained model, the first sample set including first samples, the first sample including a social text and an emoticon label corresponding to the social text.

The server obtains a large quantity of social texts including emoticons, correspondingly processes the obtained social texts to determine emoticon labels corresponding to the social texts, and further uses the social texts and the emoticon labels corresponding to the social texts as first samples. In this way, a large quantity of first samples are generated, to form a first sample set. Further, the pre-constructed initial classification model is trained by using the first samples in the first sample set, to continuously optimize model parameters of the initial classification model, so as to obtain the pre-trained model.

The foregoing social texts may be texts posted by a user in status posting areas of social software, and carry emoticons. For example, the user posts texts with emoticons in status posting areas such as a Weibo status posting zone, WeChat moments, and Qzone. In addition, the foregoing social texts may be alternatively texts transmitted by the user to other users through the social software, which carry emoticons. For example, the user may transmit texts with emoticons to other users through social software such as WeChat, Weibo, and QQ.

The first sample set is generated after the server performs specific processing on the obtained social texts, and the method for generating the first sample set is described in the subsequent embodiments in detail. For details, refer to the relevant description in the subsequent embodiments.

In a possible implementation, when training the initial classification model by using the first sample, the server may first perform word segmentation processing on the social text in the first sample by using a word segmentation tool, to obtain a word segmentation sequence corresponding to the social text, and further input the word segmentation sequence corresponding to the social text into the initial classification model. The initial classification model outputs a predicted sentiment class probability distribution corresponding to the social text by analyzing the word segmentation sequence corresponding to the social text, compares the predicted sentiment class probability distribution with the sentiment class probability distribution corresponding to the emoticon label in the first sample, to generate a comparison result, and further adjusts the model parameters of the initial classification model based on the comparison result.

In this way, the parameters of the initial classification model are iteratively adjusted according to the foregoing manner by using the first samples in the first sample set, so that the initial classification model is gradually converged. That is, the model performance of the initial classification model is gradually optimized. When the initial classification model meets a convergence condition, the pre-trained model is determined according to a model structure and the model parameters of the current initial classification model. The convergence condition may be set by a developer. For example, the convergence condition may be that: an error between an output result of the initial classification model and a correct result is less than an error threshold.

The foregoing initial classification model may include a word embedding layer, a convolutional layer, at least one feature extraction layer, and a classification layer. The feature extraction layer may include a plurality of convolutional layers and one pooling layer, each convolutional layer being connected to all subsequent convolutional layers.

FIG. 3 is a schematic architectural diagram of a model training process according to an embodiment of this application. The figure shows a network structure and a dual training architecture of the model. The dual training architecture may include S1: a pre-training process and S2: a training process. The initial classification model on which the pre-training process is based is first explained in the following based on FIG. 3. As shown in FIG. 3, the initial classification model includes a word embedding layer 310, a convolutional layer 320, at least one feature extraction layer 330, and a classification layer 341.

The word embedding layer 310 may embed a high-dimensional space whose quantity of dimensions is equal to a total word quantity into a lower-dimensional continuous vector space, and each word or phrase is mapped to be a vector in a real number domain.

The convolutional layer 320 includes a plurality of convolution kernels with different sizes, uses an output of the word embedding layer 320 as an input of the convolutional layer, and extracts semantic information in the text layer by layer by performing a convolution operation on the input data, to obtain a feature with a higher abstraction degree.

The feature extraction layer 330 includes a plurality of convolutional layers and a pooling layer, where the convolutional layers are not only connected to adjacent convolutional layers, but also directly connected to all convolutional layers arranged behind. As shown in FIG. 3, the feature extraction layer 330 includes a convolutional layer 331, a convolutional layer 332, a convolutional layer 333, a convolutional layer 334, and a pooling layer 335. The convolutional layer 331 not only has a connection relationship with the adjacent convolutional layer 332, but also has a direct connection relationship with both the convolutional layer 333 and the convolutional layer 334. Similarly, the convolutional layer 332 not only has a connection relationship with the adjacent convolutional layer 331 and the convolutional layer 333, but also has a direct connection relationship with the convolutional layer 334.

The feature extraction layer 330 may alternatively include any quantity of convolutional layers, and the quantity of convolutional layers in the feature extraction layer 330 shown in FIG. 3 is only an example. The quantity of convolutional layers included in the feature extraction layer is not limited herein.

The convolutional neural network is relatively friendly to parallel processing of a graphics processing unit (GPU). Therefore, to train the initial classification model that includes a large quantity of densely connected convolutional layers can greatly improve the model training efficiency, thereby effectively saving the time cost of model training and model testing.

In addition to using the convolutional layer to extract a feature, in actual application, the foregoing feature extraction layer 330 may further use a network structure such as a multilayer perceptron (MLP), a residual network, or a bidirectional long short-term memory (BiLSTM) network to replace the convolutional layer. The neural network structure included in the feature extraction layer 330 is not limited herein.

In actual application, to improve the accuracy of model classification, the initial classification model may include a plurality of feature extraction layers 330. When the plurality of feature extraction layers 330 are included, the plurality of feature extraction layers 330 are connected in series, and an output of a previous feature extraction layer 330 is used as an input of a next feature extraction layer 330.

The classification layer 341 further determines an emoticon label corresponding to the social text based on the output of the feature extraction layer 330.

In some embodiments, the initial classification model may further include a global pooling layer 350 and at least one fully-connected layer 360, where the global pooling layer 350 is disposed behind the feature extraction layer 330, and at least one fully-connected layer 360 is connected in serial, and is disposed behind the global pooling layer 350 and in front of the classification layer 341.

The initial classification model structure shown in FIG. 3 is only an example. In actual application, the initial classification model may be in another structure. The model structure of the initial classification model is not limited herein.

Step 202. The server trains the pre-trained model by using a second sample set, to obtain a social text sentiment classification model, the social text sentiment classification model using a social text as an input and using a sentiment class probability distribution corresponding to the social text as an output, the second sample set including second samples, the second sample including a social text and a sentiment classification label corresponding to the social text.

After obtaining the pre-trained model through training, the server further trains the pre-trained model by using the second samples in the second sample set, to obtain the social text sentiment classification model. The social text sentiment classification model can use a social text as an input and use a sentiment class probability distribution corresponding to the social text as an output, and the sentiment class probability distribution is probabilities of the social text corresponding to various sentiment classes.

The second sample is a supervised sample generated based on manual labeling, and includes a social text and a sentiment classification label corresponding to the social text. The sentiment classification label may represent a sentiment class corresponding to the social text. The social text in the second sample may be a social text carrying emoticons, or the social text in the second sample may be a plain text without emoticons.

Moreover, the social texts in the second sample set and the first sample set may be the same, or may be different. In consideration of relatively high manual labeling costs, during specific implementation, to save the labor costs, the second sample set may include much fewer samples than the first sample set. Certainly, during implementation of this application, the quantity of samples may be not specifically limited. For example, the second sample set and the first sample set may include the same quantity or different quantities of samples.

When obtaining the second sample, the server may first obtain the social text, then manually add a corresponding sentiment classification label to the obtained social text, and use the social text and the sentiment classification label corresponding to the social text as the second sample, thereby obtaining a preset quantity of second samples, and forming the second sample set.

When the social text is in a microblog, the sentiment label corresponding to the social text in the second sample is correspondingly used for representing a sentiment polarity of the microblog. When the social text is in a moments status, the sentiment label corresponding to the social text in the second sample is correspondingly used for representing a sentiment polarity of the status, and so on.

The classification of sentiment labels may include a positive polarity, a negative polarity, and a neutral, where a sentiment label of the positive polarity generally corresponds to a positive sentiment class, a sentiment label of the negative polarity generally corresponds to a negative sentiment class, and a sentiment label of the neutral does not have an obvious sentiment tendency.

Certainly, the classification of the sentiment labels is not limited to the positive polarity, the negative polarity and the neutral, but also may be classification including pleasure, anger, sorrow, joy and the like. That is, the classification of the sentiment labels may be set according to actual requirements. The classification of the sentiment labels is not specifically limited herein.

The pre-trained model is a model obtained through training by using a large quantity of first samples, and the pre-trained model already has a relatively strong sentiment classification ability. Therefore, when the pre-trained model is trained by using the second samples, the pre-trained model is trained by using only a small quantity of second samples, the model performance may be further optimized, and it ensures that the optimized social text sentiment classification model has better model performance, thereby reducing the quantity of manual labeled samples required in the training process, and saving costs required for manually labeling the samples.

In a possible implementation, when training the pre-trained model by using the second sample set, the server may first perform word segmentation processing on the social text in the second sample by using the word segmentation tool, to obtain a word segmentation sequence corresponding to the social text, and further input the word segmentation sequence corresponding to the social text into the pre-trained model obtained through training in step 201. The pre-trained model outputs a predicted sentiment class probability distribution corresponding to the social text by analyzing the word segmentation sequence corresponding to the social text, compares the predicted sentiment class probability distribution with the sentiment class probability distribution generated according to the sentiment classification label in the second sample, to generate a comparison result, and further adjusts the model parameters of the pre-trained model based on the comparison result.

In this way, the model parameters of the pre-trained model are iteratively adjusted according to the foregoing manner by using the second samples in the second sample set, so that the pre-trained model further tends to converge. That is, the model performance of the pre-trained model is gradually optimized. When the model performance of the pre-trained model meets the convergence condition, the social text sentiment classification model is determined according to the model structure and the model parameters of the current pre-trained model.

When the second sample set includes a relatively small quantity of second samples, if overall training is directly performed on the pre-trained model, generally, effective optimization training can only be performed on a partial network structure close to the input of the model, and it is difficult to effectively optimize the network structure close to the output of the model. To ensure effective optimization training on all network structures in the pre-trained model, in this application, the pre-trained model is trained in a manner of freezing and unfreezing weights, where each network structure in the pre-trained model is modularized, and the modules are trained one by one by using the second sample set, to ensure that each network structure in the pre-trained model is effectively optimized.

The pre-trained model obtained through training by using the first sample set has basically same model structure as the initial classification model. That is, when the initial classification model includes a word embedding layer, a convolutional layer, at least one feature extraction layer, and a classification layer, the pre-trained model also includes a word embedding layer, a convolutional layer, at least one feature extraction layer, and a classification layer.

When the server trains, based on the model structure of the pre-trained model and in a manner of freezing and unfreezing weights, the pre-trained model by using the second sample set, the server may first perform functional modularization processing on the pre-trained model, to obtain a plurality of submodules, each submodule including at least one computing layer. Further, the server sequentially trains, in a manner of freezing and unfreezing weights, the submodule by using the second sample set, until all the submodules are in a convergence state. The server uses a model including the plurality of submodules in the convergent state as the social text sentiment classification model. The manner of freezing and unfreezing weights means that during training of a submodule, a weight of the submodule is unfrozen to train the submodule, while weights of remaining submodules are frozen.

For ease of understanding the foregoing training process, description is made below with reference to the entire training process of the social text sentiment classification model shown in FIG. 3.

First, network parameters of network layers are optimized by using the first sample set according to a training route indicated by a dotted arrow S1 in FIG. 3, to obtain the pre-trained model through training. Then, based on the pre-trained model, the network parameters of the network layers are then optimized by using the second sample set according to a training route indicated by a dotted arrow S2 in FIG. 3, to finally obtain the social text sentiment classification model through training.

As shown in FIG. 3, during training of the pre-trained model, a used classifier is a classifier 341, and the classifier 341 is configured to determine, according to an output of a previous neural network layer, probabilities that various emoticon labels correspond to an input social texts. During training of the social text sentiment classification model, a used classifier is a classifier 342, and the classifier 342 is configured to correspondingly determine, according to an output of a previous neural network layer, a sentiment class probability distribution corresponding to the social text.

The model structure of the initial classification model shown in FIG. 3 is actually the model structure of the pre-trained model, and is also the model structure of the social text sentiment classification model.

For ease of description, hereinafter, it is assumed that the initial classification model shown in FIG. 3 includes two feature extraction layers 330.

During training of the pre-trained model, the server divides the pre-trained model into a submodule a, a submodule b, a submodule c, and a submodule d. The submodule a includes the word embedding layer 310 and the convolutional layer 320, the submodule b includes the first feature extraction layer 330, the submodule c includes the second feature extraction layer 330, and the submodule d includes the global pooling layer 350 and two fully-connected layers 360.

During division of submodules, the server may alternatively divide the pre-trained model into other forms. That is, the division manner of submodules is not limited to the foregoing division manner. The division manner of submodules is not limited herein.

After finishing the division of the submodules, the server trains the submodule a, the submodule b, the submodule c, and the submodule d one by one in a manner of freezing and unfreezing weights by using the second samples in the second sample set. In a possible implementation, the server first trains the submodule a by using the second samples. In this case, model parameters of neural network layers in the submodule a are unfrozen, model parameters of neural network layers in the submodule b, the submodule c, and the submodule c are frozen, and the submodule a is trained by using the second samples, so that the model parameters of the neural network layers in the submodule a generally tend to converge. It is determined that the training of the submodule a is finished after the submodule a is in a convergence state. Further, the server trains the submodule b by using the second samples. In this case, model parameters of neural network layers in the submodule b are unfrozen, model parameters of neural network layers in the submodule a, the submodule c, and the submodule d are frozen, and the submodule b is trained by using the second samples, so that the model parameters of the neural network layers in the submodule b generally tend to converge. It is determined that the training of the submodule b is finished after the submodule b is in the convergence state. By analogy, the submodule c and the submodule d are trained in a similar manner, and the pre-trained model is used as the social text sentiment classification model after all of the submodule a, the submodule b, the submodule c, and the submodule d are in the convergence state.

In actual application, the server may sequentially train the divided submodules according to the model structure of the pre-trained model. Certainly, the server may alternatively train the submodules according to other sequences. The training sequence of the server is not limited herein.

In actual application, the training manner of the pre-trained model is not limited to the foregoing manner of freezing and unfreezing weights. The server may alternatively train the pre-trained model according to actual requirements in other training manners, to obtain the social text sentiment classification model. The training manner for training the pre-trained model is not limited herein.

In the classification model training method provided in the foregoing embodiments, the initial classification model is trained by using the first sample set including a large quantity of weakly supervised samples, to obtain the pre-trained model. The weakly supervised sample herein is the first sample, and includes a social text and an emoticon label corresponding to the social text. By using such a characteristic that the emoticon carried in the social text can represent a sentiment classification of the social text to some extent, the emoticon carried in the social text is directly used as the sentiment classification label corresponding to the social text, and it is unnecessary to add a sample label manually. After the training of the pre-trained model is completed, further, the pre-trained model is further optimally trained by using the second sample set including a small quantity of supervised samples. The supervised sample herein is the second sample, and includes a social text and a manually added sentiment classification label corresponding to the social text, so as to obtain the social text sentiment classification model that uses a social text as an input, and uses a sentiment class probability distribution corresponding to the social text as an output. In this way, the model is trained by combining a large quantity of weakly supervised samples with a small quantity of supervised samples, to ensure that the social text sentiment classification model with better model performance is trained without increasing costs of manual sample labeling, that is, trained by using a small quantity of manually labeled samples.

In the classification model training method, the server first trains the initial classification model by using a large quantity of weakly supervised samples, that is, the first sample set, to obtain the pre-trained model, and then trains the pre-trained model by using a small quantity of supervised samples, that is, the second sample set, to obtain the social text sentiment classification model. The initial classification model is trained based on a large quantity of weakly supervised samples, to effectively ensure that the social text sentiment classification model with better performance can still be obtained subsequently through training by using a small quantity of supervised samples.

It can be seen that, in the classification model training method provided in this embodiment of this application, the first sample set plays a crucial role. A method for generating a first sample set provided in the embodiments of the application is described below with reference to FIG. 4.

Figure 4:
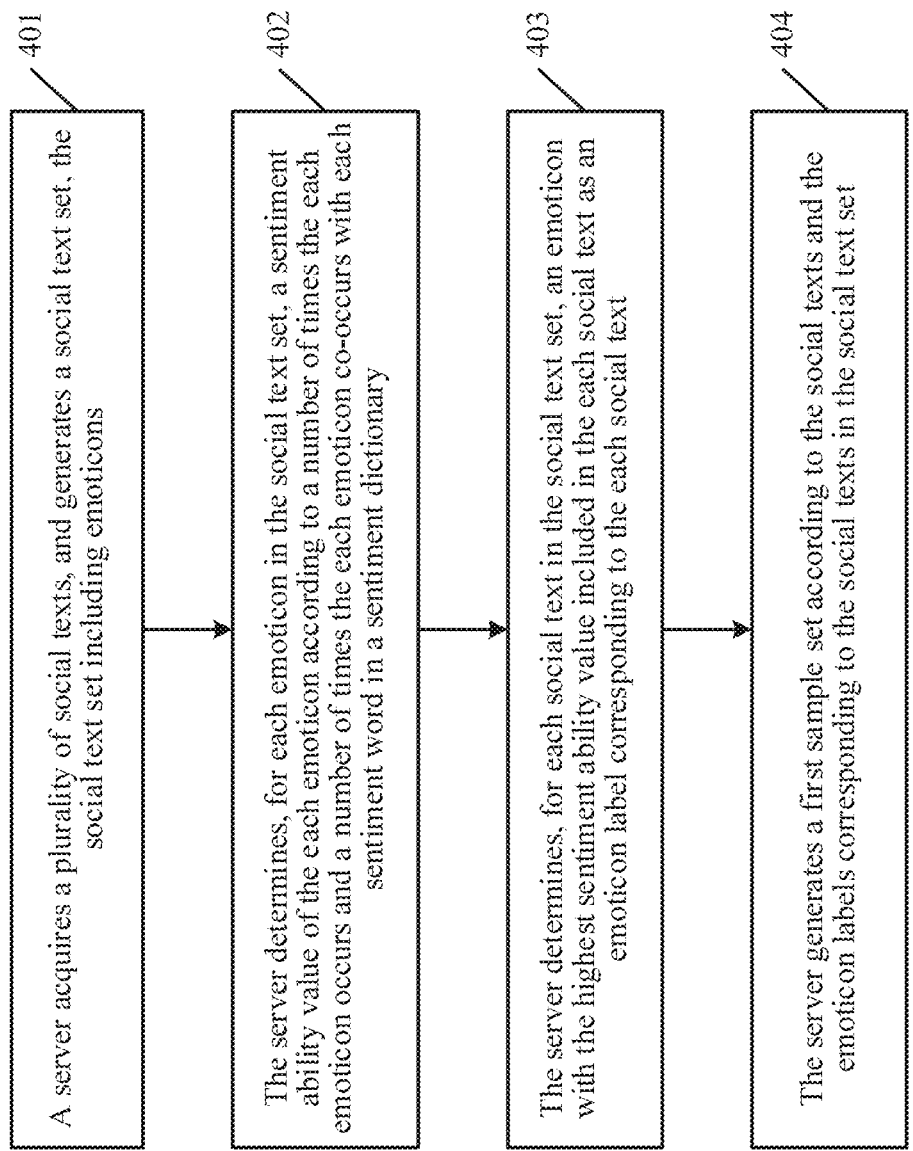
FIG. 4 is a schematic flowchart of a method for generating a first sample set according to an embodiment of this application.

FIG. 4 is a schematic flowchart of a method for generating a first sample set according to an embodiment of this application. For ease of description, in the following embodiment, description is made still by using a server as an execution body. The execution body of the method for generating a first sample set is not limited only to the server, and the method may alternatively be applied to a device having a model training function, such as a terminal device. As shown in FIG. 4, the method includes the following steps.

Step 401. The server acquires a plurality of social texts, and generates a social text set, the social text set including emoticons.

The server may acquire a large quantity of social texts in various manners, all the acquired social texts include emoticons, and the emoticons may be preset emoticons in social software, or may be emoji. Further, the server forms the social text set by using such emoticon-containing social texts.

In a possible implementation, the server may obtain the foregoing social texts in the following manner:

In a possible implementation, the server may extract social texts from a database associated with the server. In a possible implementation, the server may recognize whether historical social texts stored in a social text storage database carry emoticons, obtain social texts carrying emoticons from the historical social texts, and form the social text set by using the social texts.

In another possible implementation, the server may acquire social texts from a terminal device in real time. In a possible implementation, the server receives social texts transmitted by the terminal device. The social text may be social texts posted by a user in a status posting area of social software, or may be social texts transmitted by the user to other users through the social software. The server recognizes whether the social texts carry emoticons, obtains social texts carrying emoticons, and uses the social texts to form the social text set.

In still another possible implementation, the server may further obtain social texts from other servers. The server communicates with other social software servers, to request the other social software servers to provide social texts carrying emoticons for the server. Correspondingly, the other social software servers may acquire social texts carrying emoticons from stored historical social texts and social texts received in real time, and transmit the social texts carrying emoticons to the server, so that the social text set is formed by using the social texts.

In actual application, the server may further acquire social texts carrying emoticons in other manners. The foregoing acquisition manners are only examples. The manner in which the server acquires the social texts is not limited herein.

Step 402. The server determines, for each emoticon in the social text set, a sentiment ability value of the emoticon according to a number of times the emoticon occurs and a number of times the emoticon co-occurs with each sentiment word in a sentiment dictionary.

After generating the social text set, the server counts all the emoticons included in the social text set, and further calculates a sentiment ability value corresponding to each emoticon. In a possible implementation, the server needs to determine the sentiment ability value corresponding to the emoticon based on the number of times the emoticon occurs in the social text set and the number of times the emoticon co-occurs with each sentiment word in the sentiment dictionary. The co-occurrence of the emoticon and the sentiment word is the number of times that the emoticon and the sentiment word occur in the same social text.

The sentiment dictionary includes a large quantity of sentiment words of positive and negative sentiment classes. Correspondingly, if the emoticon and a sentiment word co-occur in the same social text, it indicates that the emoticon may be associated with the sentiment word to some degree, or the emoticon may belong to the same sentiment class as the sentiment word.

In a possible implementation, the sentiment ability value corresponding to the emoticon may be calculated based on the following formula (1) and formula (2):

$$Pscore(e_i) = \frac{\sum_{j=1}^{N} \text{count}(e_i, p_j) * \log_{10}(\text{count}(e_i))}{\sum_{ij=1}^{N} \text{count}(e_i, p_j) + \sum_{k=1}^{M} \text{count}(e_i, n_k)} \quad (1)$$

$$Nscore(e_i) = \frac{\sum_{k=1}^{M} \text{count}(e_i, n_k) * \log_{10}(\text{count}(e_i))}{\sum_{j=1}^{N} \text{count}(e_i, p_j) + \sum_{k=1}^{M} \text{count}(e_i, n_k)} \quad (2)$$

$Pscore(e_i)$ is a positive sentiment ability value corresponding to an $i^{th}$ emoticon in a social text set; $Nscore(e_i)$ is a negative sentiment ability value corresponding to the $i^{th}$ emoticon in the social text set; $\text{count}(e_i, p_j)$ is a number of times the $i^{th}$ emoticon co-occurs with a $j^{th}$ positive sentiment word in a sentiment dictionary; $\text{count}(e_i, n_k)$ is a number of times the $i^{th}$ emoticon co-occurs with a $k^{th}$ negative sentiment word in the sentiment dictionary; $\text{count}(e_i)$ is a number of times the $i^{th}$ emoticon occurs in the social text set; and M and N are quantities of positive sentiment words and negative sentiment words recorded in the sentiment dictionary.

The positive sentiment ability value and the negative sentiment ability value corresponding to the $i^{th}$ emoticon in the social text set are added, to obtain a sentiment ability value of the $i^{th}$ emoticon. In this way, sentiment ability values corresponding to the emoticons in the social text set are calculated.

Step 403. The server determines, for each social text in the social text set, an emoticon with the highest sentiment ability value included in the social text as an emoticon label corresponding to the social text.

After determining the sentiment ability values of the emoticons in the social text set, the server may further determine emoticon labels corresponding to the social texts in the social text set based on the sentiment ability values of the emoticons. In a possible implementation, the emoticon with the highest sentiment ability value included in the social text may be directly determined as the emoticon label corresponding to the social text.

When the social text includes only one emoticon, the emoticon is correspondingly the emoticon with the highest sentiment ability value in the social text. Therefore, the emoticon may be directly used as the emoticon label corresponding to the social text. When the social text includes a plurality of emoticons, the sentiment ability values of the emoticons may be sorted, and further, the emoticon with the highest sentiment ability value is selected from the plurality of emoticons as the emoticon label corresponding to the social text.

Many emoticons may have relatively weak sentiment ability values. That is, many emoticons do not represent sentiments effectively. In actual application, such emoticons do not contribute much to the sentiment classification. Therefore, during training of the classification model, to reduce unnecessary resource consumption, only some emoticons capable of effectively representing sentiments may be used as the emoticon labels. That is, the emoticons with higher sentiment ability values are used as the emoticon labels. The first samples are generated based on the social texts including such emoticon labels.

In a possible implementation, the server may sort the emoticons according to a descending order of the sentiment ability values of the emoticons, and select top M emoticons from the social text set as target emoticons, M being a positive integer; further, the server determines the target emoticon with the highest sentiment ability value in the social text as the emoticon label corresponding to the social text.

In a possible implementation, the server may sort the sentiment ability values of all the emoticons in the social text set according to a descending order, and select the top M emoticons as the target emoticons. Further, the server selects social texts including the M target emoticons from the social text set, and determines, for the selected social texts, emoticon labels corresponding to the selected social texts, that is, determines target emoticons with the highest sentiment ability values in the social texts as the emoticon labels corresponding to the social texts.

A value of M may be set according to actual requirements, for example, the value of M may be set to 60, 20, 8, or the like. The specific value of M is not limited herein.

Step 404. The server generates a first sample set according to the social texts and the emoticon labels corresponding to the social texts in the social text set.

After determining, for all or some of the social texts in the social text set, the emoticon labels corresponding to all or some of the social texts, the server may use each social text and the emoticon label corresponding to the social text as a first sample. In this way, the server determines several first samples, and forms the first sample set by using all the first samples.

In many cases, the social text acquired by the server may not conform to sample requirements for model training. To ensure a better model training effect, when generating the first sample, the server may further perform preprocessing on the social text.

In a possible implementation, when the social text includes an emoticon, the server needs to remove the emoticon from the social text. When the social text is a social text such as a microblog text, the server further needs to replace a forwarding symbol in the social text and content connected to the forwarding symbol with whitespace characters, for example, replace @XXX in the social text with whitespace characters. When the social text includes a page link, the server may alternatively replace the page link with whitespace characters. The server may further replace full-width symbols in the social text with half-width symbols, and convert a text in a traditional form in the social text into a text in a simplified form. When the social text includes some network overused words, the server may correspondingly convert the overused words into standard words according to the meaning of the overused words. When the social text includes a hashtag label, the server correspondingly deletes the hashtag label in the social text. When the social text includes capital letters, the server may further replace the capital letters with small letters. When the social text includes special characters other than normal punctuations, the server may replace the special characters with spaces. When the social text includes a plurality of continuous spaces, the server may replace the continuous spaces with one space, and in a case that the social text includes spaces at the head and tail, remove the spaces at the head and tail.

When preprocessing the social text, the server may select one or more of the foregoing preprocessing manners to correspondingly preprocess the social text according to actual requirements and an actual situation of the social text. Certainly, the server may further correspondingly preprocess the social text according to actual requirements of the social text by using other preprocessing manners. The preprocessing manner of the social text is not limited herein.

During training of the initial classification model by using the first sample set, to ensure that training can be effectively performed for all the sentiment classes corresponding to the emoticon labels, that is, to ensure that the pre-trained model obtained through training by using the first sample set can effectively divide inputted social texts into the sentiment classes corresponding to the emoticon labels, when generating the first sample set, the server may extract social texts corresponding to different emoticons from the social text set based on a principle that quantities of social texts corresponding to different emoticons are the same. Further, the server generates the first sample set according to the extracted social texts and emoticon labels corresponding to the extracted social texts.

In a possible implementation, the server may extract the same quantity of social texts for the emoticons in the social text set, and further generate the first samples based on the extracted social texts and the emoticons, and form the first sample set by using all the first samples.

When the server selects only M emoticons with high sentiment ability values as emoticon labels, the server needs to abstract the same quantity of social texts from the social text set for each of the M emoticons. That is, it is ensured that the quantities of social texts corresponding to the M emoticons are the same. Further, the server generates the first samples based on the extracted social texts and the M emoticons, and forms the first sample set by using all the generated first samples.

In the foregoing method for generating the first sample set, the server determines the sentiment ability value corresponding to each emoticon based on the number of times the emoticon occurs in the social text set and the number of times the emoticon co-occurs with each sentiment word in a sentiment dictionary, and further determines the emoticon labels corresponding to the social texts in the social text set based on the sentiment ability values of the emoticons. In this way, the server generates the first samples by using the social texts and the emoticon labels corresponding to the social texts, and forms the first sample set by using the generated first samples. In this method, by using such a characteristic that the emoticon carried in the social text can represent a sentiment classification of the social text to some extent, the sentiment classification label corresponding to the social text is directly generated according to the emoticon carried in the social text, and it is unnecessary to label sample data manually, thereby saving the costs of manual sample labeling. The initial classification model is trained based on a large quantity of first samples, to ensure that the pre-trained model obtained through training has a basic sentiment classification ability. Therefore, when the pre-trained model is further trained by using manual labeled data, it can be ensured that the social text sentiment classification model obtained through training has better model performance without requiring a large amount of manual labeled data.

Based on the classification model training method provided in the foregoing embodiments, the social text sentiment classification model with better model performance may be obtained through training. Based on the social text sentiment classification model, this application further provides a classification method, so that the functions of the social text sentiment classification model in actual application can be understood more clearly.

The classification method provided in the embodiments of this application may be applied to a device having a data processing function, such as a terminal device or a server. The terminal device may be a smartphone, a computer, a personal digital assistant (PDA), a tablet computer or the like. The server may be an application server, or may be a Web server. During actual application deployment, the server may be an independent server, or may be a cluster server.

The social text sentiment classification model obtained through training based on the foregoing classification model training method may run on the terminal device or the server. When the social text sentiment classification model runs in the terminal device, the terminal device may directly determine, by using the social text sentiment classification model, a sentiment class of a social text inputted by a user. When the social text sentiment classification model runs in the server, the server may obtain a social text transmitted by the terminal device, and determine, by using the social text sentiment classification model, a sentiment class of the social text transmitted by the terminal device.

The following specifically describes, through embodiments, the classification method provided in this application.

Figure 5:
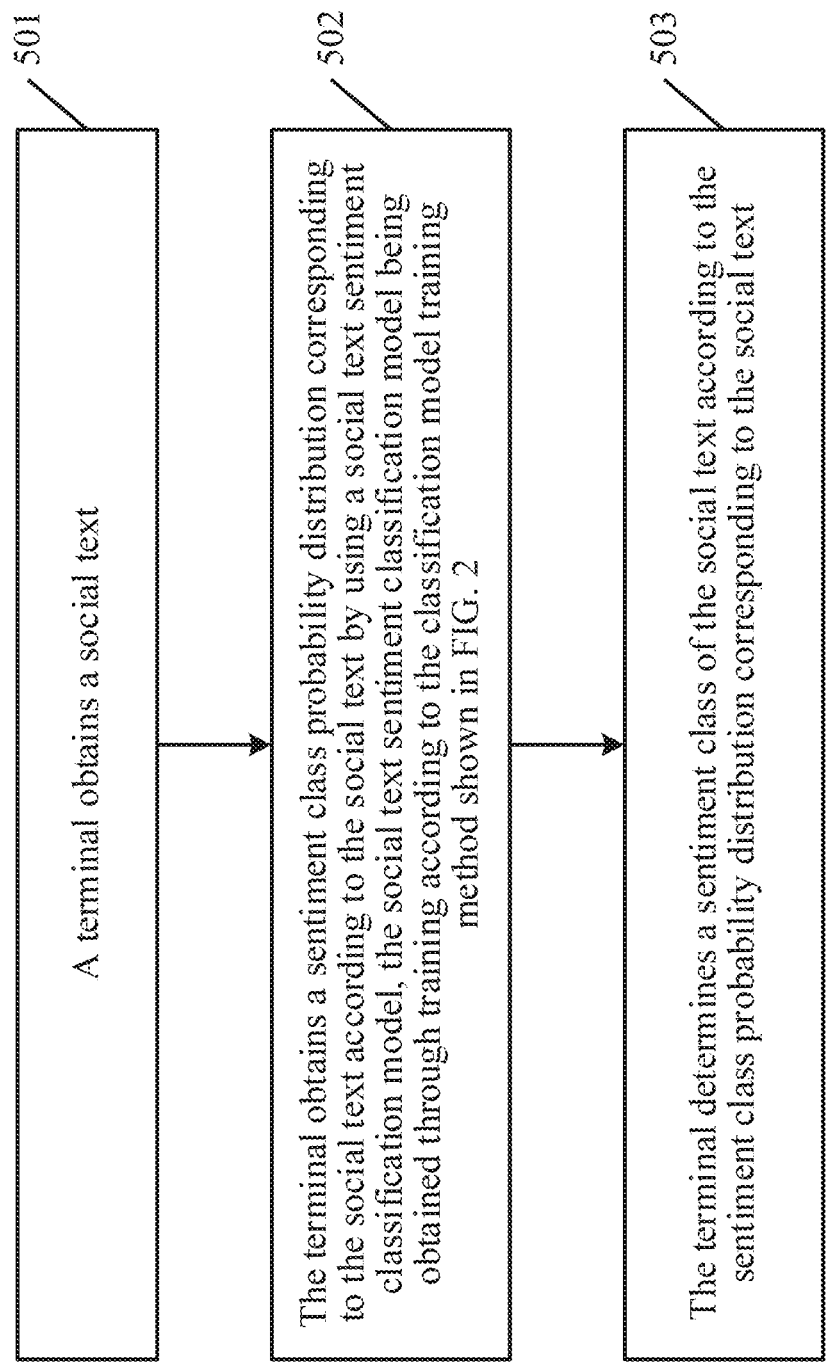
FIG. 5 is a schematic flowchart of a classification method according to an embodiment of this application.

FIG. 5 is a schematic flowchart of a classification method according to an embodiment of this application. For ease of description, in this embodiment, a terminal device is used as an execution body to describe the solution. In actual application, the execution body of the classification method may be alternatively a device such as a server. As shown in FIG. 5, the classification method includes the following steps.

Step 501. The terminal obtains a social text.

In a possible implementation, when obtaining the social text, the terminal device may obtain texts posted by a user on some social platforms as the social text. For example, the terminal device may obtain texts posted by the user on public social platforms such as Weibo, WeChat moments, and Qzone as the social text. In addition, the terminal device may alternatively obtain a text inputted by the user on a specific interface as the social text. For example, the terminal device may obtain a text inputted by the user on a chat interface as the social text.

In some cases, the terminal device may further convert voice inputted by the user into a text correspondingly by using a voice recognition function, and the terminal device may alternatively use the text obtained through such conversion as the social text.

In actual application, the terminal device may obtain the social text in various manners. The foregoing obtaining manners are only examples provided in this embodiment. The manner in which the terminal device obtains the social text is not limited herein.

Step 502. The terminal obtains a sentiment class probability distribution corresponding to the social text according to the social text by using a social text sentiment classification model, the social text sentiment classification model being obtained through training according to the classification model training method shown in FIG. 2.

After obtaining the social text, the terminal device inputs the obtained social text into the social text sentiment classification model running in the terminal device, processes the social text by using the social text sentiment classification model, and outputs the sentiment class probability distribution corresponding to the social text.

The foregoing social text sentiment classification model is a model obtained through training according to the classification model training method shown in FIG. 2. The model uses a social text as an input and uses a sentiment class probability distribution corresponding to the social text as an output.

In a possible implementation, after obtaining the social text, the terminal device may first perform word segmentation processing on the social text, to obtain a word segmentation sequence corresponding to the social text, and further input the word segmentation sequence corresponding to the social text into the social text sentiment classification model. The word segmentation sequence of the social text is processed in the social text sentiment classification model through the word embedding layer, the convolutional layer, the feature extraction layer, the global pooling layer, the fully-connected layer, and the classification layer, to finally output the sentiment class probability distribution corresponding to the social text. The sentiment class probability distribution may represent probabilities of the social text corresponding to various sentiment classes.

When the sentiment classification of the social text sentiment classification model includes a positive polarity, a negative polarity and a neutral, correspondingly, the sentiment class distribution probabilities corresponding to the social text outputted by the social text sentiment classification model are a probability that the social text corresponds to a positive-polarity sentiment, a probability that the social text corresponds to the negative polarity, and a sentiment probability that the social text corresponds to a neutral sentiment. When the sentiment classification of the social text sentiment classification model includes pleasure, anger, sorrow, and joy, correspondingly, the sentiment class distribution probabilities corresponding to the social text outputted by the social text sentiment classification model are probabilities that the social text corresponds to pleasure, anger, sorrow, and joy.

Certainly, the social text sentiment classification model may be further configured to distribute other forms of emotions. The sentiment classification form of the social text sentiment classification model and a representation form of the sentiment class distribution probabilities outputted by the social text sentiment classification model are not limited herein Step 503. The terminal determines a sentiment class of the social text according to the sentiment class probability distribution corresponding to the social text.

Further, the terminal device determines a sentiment class corresponding to the social text according to the sentiment class distribution probabilities outputted by the social text sentiment classification model. In a possible implementation, the terminal device may directly use a sentiment class with the highest probability value in the sentiment class distribution probabilities as the sentiment class corresponding to the social text.

For example, it is assumed that sentiment class distribution probabilities outputted by the social text sentiment classification model for a social text are as follows: positive polarity 70%, negative polarity 5%, and neutral 25%. Correspondingly, the terminal device may directly determine that a sentiment class corresponding to the social text is the positive polarity.

In a possible implementation, the terminal may obtain the sentiment class with the highest probability value in the sentiment class distribution probabilities. When the probability value of the sentiment class is greater than a probability threshold, the terminal may use the sentiment class as the sentiment class corresponding to the social text. When the probability value of the sentiment class is less than the probability threshold, the terminal cannot determine the sentiment class corresponding to the social text. The probability threshold may be set by a developer. For example, when sentiment class distribution probabilities outputted by the social text sentiment classification model for a social text are as follows: positive polarity 65%, negative polarity 5%, and neutral 30%, and a probability threshold is 60%, the terminal device may determine that a sentiment class corresponding to the social text is the positive polarity. When sentiment class distribution probabilities outputted by the social text sentiment classification model for a social text are as follows: positive polarity 50%, negative polarity 5%, and neutral 45%, and a probability threshold is 60%, the terminal device may output prompt information that a sentiment class of the social text cannot be determined.

In the foregoing classification method, the terminal device processes the obtained social text by using the social text sentiment classification model obtained through training based on the classification model training method shown in FIG. 2, and correspondingly determines the sentiment class of the obtained social text. The foregoing social text sentiment classification model is trained by using a large quantity of weakly supervised samples and a small quantity of supervised samples, and has good model performance. Therefore, the sentiment class determined for the social text by using the social text sentiment classification model is accurate.

The foregoing classification method shown in FIG. 5 may be applied to various application scenarios. The following further describes the classification method with reference to several typical application scenarios.

In a possible application situation, the classification method may be applied to an application scenario using a chat robot for chatting. In such an application scenario, an execution body of the classification method is a terminal device. The terminal device runs the social text sentiment classification model.

The terminal device obtains a chat text inputted by a user through a chat interface as a social text. In a possible implementation, the user may input a chat text on a chat interface provided by the terminal device. The terminal device correspondingly obtains the chat text inputted by the user, and uses the chat text as the social text. The user may alternatively input chat content through voice. After receiving the chat voice of the user, the terminal device invokes a voice recognition function to correspondingly convert the chat voice into a chat text, and uses the chat text as the social text.

After obtaining the social text, the terminal device correspondingly processes the social text by using the social text sentiment classification model and the foregoing classification method shown in FIG. 5, and determines a sentiment class of the social text.

Further, the terminal device may further determine a reply content matching the sentiment class of the social text and the social text; and display the reply content on the chat interface.

In a possible implementation, the terminal device may correspondingly generate a reply content for replying to the social text according to the determined sentiment class of the social text and the meaning corresponding to the social text, and further display the generated reply content on the chat interface. Certainly, the terminal device may alternatively further convert the reply content into corresponding voice, and reply to the user by playing the voice.

Therefore, a sentiment class of the chat content of the user is accurately determined based on the social text sentiment classification model, ensuring that a suitable reply content can be generated subsequently based on the sentiment class and the chat content of the user, thereby improving user experience.

In another possible application situation, the classification method may be applied to an application scenario of recommending a related object to a user. In such an application scenario, the execution body of the classification method may be a server. The server runs the social text sentiment classification model.

In many cases, the user often posts comment texts on objects such as products, news, and advertisements through public social platforms such as Weibo, WeChat moments, and Qzone. Correspondingly, the server may acquire the comment texts posted by the user, and pertinently recommend, for the user according to a sentiment tendency of the comment texts posted by the user, a related content in which the user may be interested.

The server obtains an object comment text of a specified user as the social text. In a possible implementation, the server may obtain, according to a specified user identifier, an object comment text posted by the specified user as the social text. The object comment text herein may be a comment text of the user for a product, a comment text of the user for advertisement information, or a comment text of the user for news information.

After obtaining the social text, the server correspondingly processes the social text by using the social text sentiment classification model and the foregoing classification method shown in FIG. 5, and determines a sentiment class of the social text.

Further, after determining the sentiment class of the social text, the server further recommends an object for the specified user according to the sentiment class of the social text.

In a possible implementation, if determining that the social text posted by the user for a certain object belongs to a positive sentiment, the server may correspondingly determine that the user is interested in the object. Correspondingly, the server may search for an object related to or similar to the object as a recommended object to be recommended to the user. On the contrary, if determining that the social text posted by the user for a certain object belongs to a negative sentiment, the server may correspondingly determine that the user is not interested in the object. Correspondingly, the server subsequently avoids recommending an object related to or similar to the object to the user.

Therefore, the sentiment class of the specified user for the comment object is accurately determined based on the social text sentiment classification model, ensuring that the server can effectively recommend an object to the specified user subsequently, thereby improving user experience.

In still another possible application situation, the classification method may be applied to an application scenario of analyzing public opinions. In such an application scenario, the execution body of the classification method may be a server. The server runs the social text sentiment classification model.

In many cases, a user often posts comment texts on products through public social platforms such as Weibo, WeChat moments, and Qzone. Correspondingly, when analyzing public opinions of a product, a merchant of the product needs to collect comments generated by users on the specific product in the network, so as to generate a public opinion report for the specific product according to the comments of the users.

The server obtains social texts related to a specified product. In a possible implementation, the user may select, according to keywords related to the specified product, such as a product name of the specified product and a product name abbreviation, social texts related to the specified product from social texts of social platforms.

After obtaining the social texts, the server correspondingly processes the acquired social texts related to the specified product by using the social text sentiment classification model and the foregoing classification method shown in FIG. 5, and determines respective sentiment classes of the social texts.

Further, the server generates a public opinion report of the specified product according to the respective sentiment classes of the social texts related to the specified product. In a possible implementation, after determining the respective sentiment classes of the social texts, the server correspondingly generates the public opinion report about the specified product according to a public opinion report template.

Therefore, the sentiment class of the user for the specified product is accurately determined based on the social text sentiment classification model, ensuring that the public opinion report generated based on the sentiment class is more accurate and better conforms to actual user experience.

For ease of further understanding of the classification model training method and the classification method provided in the embodiments of this application, the following provides an overall description on the classification model training method and the classification method provided in the embodiments of this application with reference to a specific application scenario.

Figure 6:
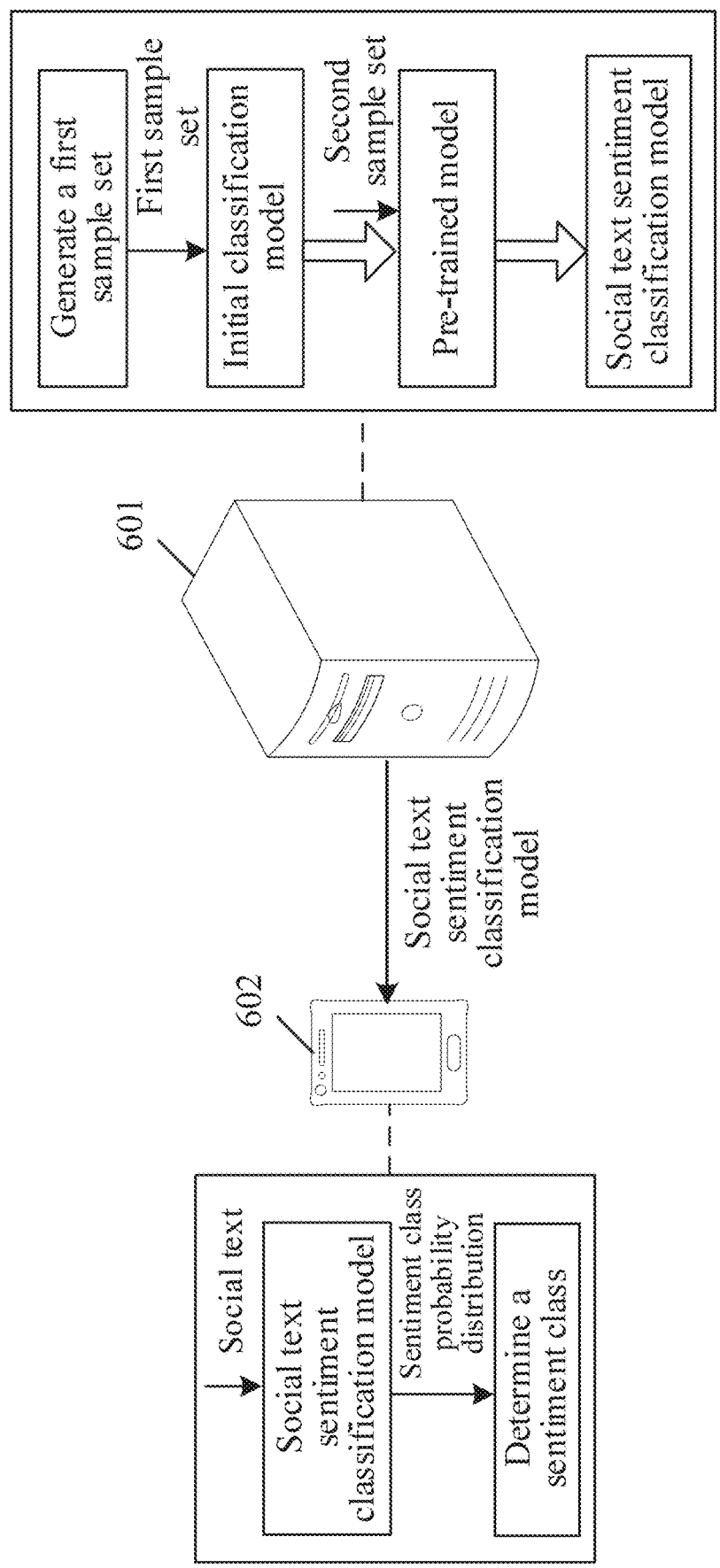
FIG. 6 is a schematic diagram of an application scenario of a classification model training method according to an embodiment of this application.

FIG. 6 is a schematic diagram of an application scenario of a classification model training method according to an embodiment of this application.

As shown in FIG. 6, before training a model, a server 601 may first acquire a large quantity of social texts including emoticons from a terminal device 602; form a social text set by using the social texts, determine, for each emoticon in the social text set, a sentiment ability value of the emoticon in the social text set according to a number of times the emoticon occurs in the social text set and a number of times the emoticon co-occurs with each sentiment word in a sentiment dictionary; further determine, for each social text in the social text set, an emoticon with the highest sentiment ability value included in the social text as an emoticon label corresponding to the social text; and combine the social text with the emoticon label corresponding to the social text to form a first sample, thereby generating a large quantity of first samples, to form a first sample set by using the first samples.

In actual application, the server 601 may alternatively acquire social texts from a database or other servers. A source of the social texts is not limited herein.

After determining the sentiment ability values of the emoticons, the server 601 may first sort the emoticons according to a descending order of the sentiment ability values of the emoticons, and select top M emoticons from the social text set, thereby generating the first samples by using only social texts including the M emoticons.

When generating the first sample set, the server 601 may extract social texts corresponding to different emoticons from the social text set based on a principle that quantities of social texts corresponding to different emoticons are the same, and generate the first samples by using the social texts.

After generating the first sample set, the server 601 trains an initial classification model by using the first samples in the first sample set, to obtain a pre-trained model. After the pre-trained model is obtained through training, the server further trains the pre-trained model by using a second sample set, to obtain a social text sentiment classification model. The second sample set includes a small quantity of supervised samples, that is, the second samples. The second sample includes a social text and a sentiment classification label that is manually labeled corresponding to the social text set.

During training using the second sample set, the pre-trained model may be trained in a manner of freezing and unfreezing weights. In a possible implementation, the server may first perform functional modularization processing on the pre-trained model, to obtain a plurality of submodules: and further sequentially train the submodule in a manner of freezing and unfreezing weights by using the second sample set, and use a model including the submodules as a social text sentiment classification model after all the submodules reach a convergence state.

After generating the social text sentiment classification model, the server 601 may transmit the social text sentiment classification model to other terminal devices or servers, to run the social text sentiment classification model on the other terminal devices or servers, so that the terminal devices or servers perform the classification method provided in this application.

For example, the terminal device 602 runs the social text sentiment classification model. After obtaining a social text inputted by a user, the terminal device correspondingly processes the social text by using the social text sentiment classification model, and obtains a sentiment class probability distribution corresponding to the social text. Therefore, the terminal device 602 may determine a sentiment class of the social text according to the sentiment class probability distribution.

For the classification model training method described above, this application further provides a corresponding classification model training apparatus, so that the classification model training method can be applied and implemented in practice.

Figure 7:
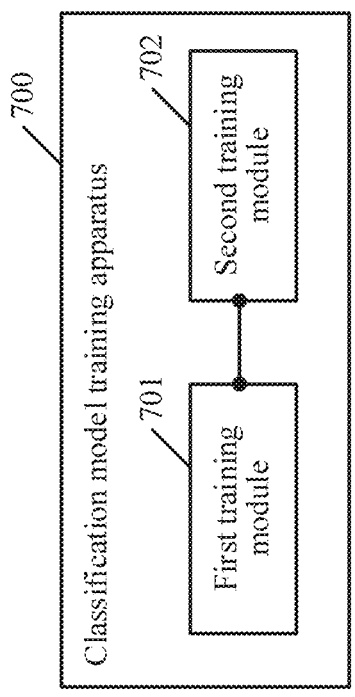
FIG. 7 is a schematic structural diagram of a classification model training apparatus according to an embodiment of this application.

FIG. 7 is a schematic structural diagram of a classification model training apparatus 700 corresponding to the foregoing classification model training method shown in FIG. 2. The classification model training apparatus 700 includes:

- a first training module 701, configured to train an initial classification model by using a first sample set, to obtain a pre-trained model, the first sample set including first samples, the first sample including a social text and an emoticon label corresponding to the social text; and
- a second training module 702, configured to train the pre-trained model by using a second sample set, to obtain a social text sentiment classification model, the social text sentiment classification model using a social text as an input and using a sentiment class probability distribution corresponding to the social text as an output, the second sample set including second samples, the second sample including a social text and a sentiment classification label corresponding to the social text.

Figure 8:
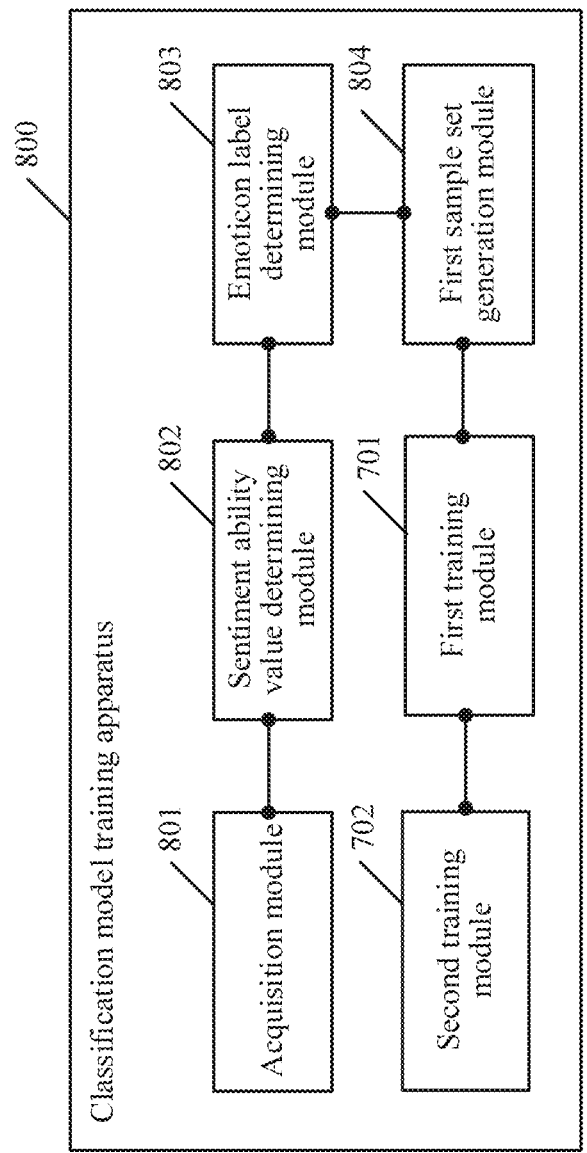
FIG. 8 is a schematic structural diagram of another classification model training apparatus according to an embodiment of this application.

In some embodiments, on the basis of the classification model training apparatus shown in FIG. 7, FIG. 8 is a schematic structural diagram of another classification model training apparatus 800 according to an embodiment of this application. The apparatus further includes:

- an acquisition module 801, configured to acquire a plurality of social texts, and generate a social text set, the social texts including emoticons;
- a sentiment ability value determining module 802, configured to determine, for each emoticon in the social text set, a sentiment ability value of the emoticon according to a number of times the emoticon occurs and a number of times the emoticon co-occurs with each sentiment word in a sentiment dictionary;
- an emoticon label determining module 803, configured to determine, for each social text in the social text set, an emoticon with the highest sentiment ability value included in the social text as an emoticon label corresponding to the social text; and
- a first sample set generation module 804, configured to generate the first sample set according to the social texts and the emoticon labels corresponding to the social texts in the social text set.

In some embodiments, on the basis of the classification model training apparatus shown in FIG. 8, the first sample set generation module 804 is specifically configured to:

- extract social texts corresponding to different emoticons from the social text set based on a principle that quantities of social texts corresponding to different emoticons are the same; and
- generate the first sample set according to the extracted social texts and emoticon labels corresponding to the extracted social texts.

Figure 9:
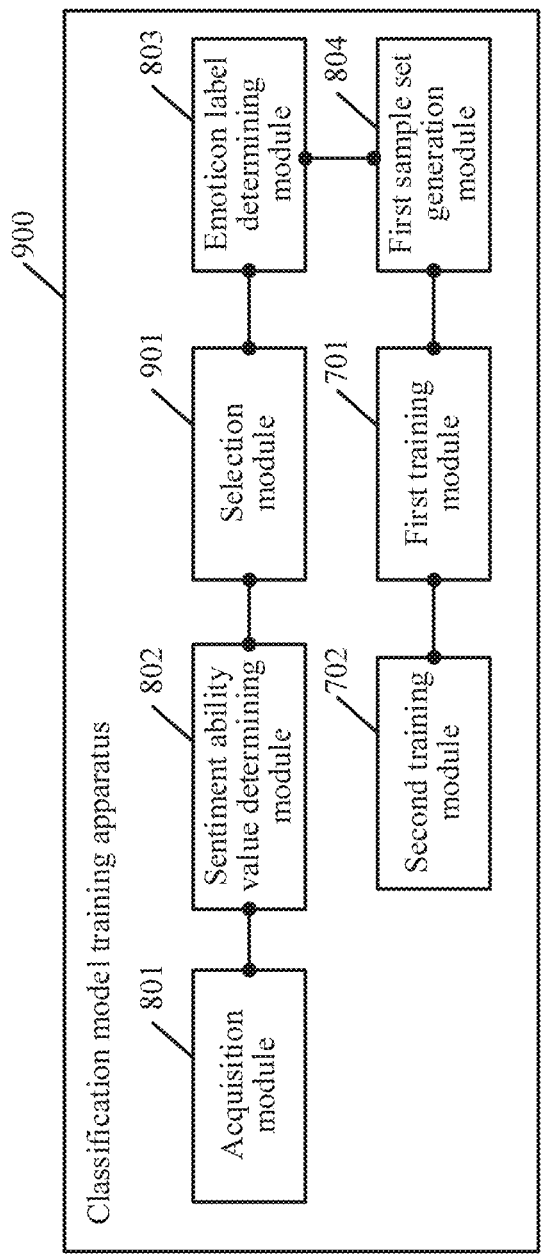
FIG. 9 is a schematic structural diagram of still another classification model training apparatus according to an embodiment of this application.

In some embodiments, on the basis of the classification model training apparatus shown in FIG. 8, FIG. 9 is a schematic structural diagram of another classification model training apparatus 900 according to an embodiment of this application. The apparatus further includes:

- a selection module 901, configured to sort the emoticons according to a descending order of the sentiment ability values of the emoticons, and select top M emoticons from the social text set as target emoticons, M being a positive integer.

The emoticon label determining module 803 is specifically configured to:

- determine a target emoticon with the highest sentiment ability value in the social text as the emoticon label corresponding to the social text.

In some embodiments, on the basis of the classification model training apparatus shown in FIG. 7, the initial classification model includes a word embedding layer, a convolutional layer, at least one feature extraction layer, and a classification layer; and the feature extraction layer includes a plurality of convolutional layers and one pooling layer, and each convolutional layer is connected to all subsequent convolutional layers.

The second training module 702 is specifically configured to:

- perform functional modularization processing on the pre-trained model, to obtain a plurality of submodules, each submodule including at least one computing layer; and
- sequentially train the submodule in a manner of freezing and unfreezing weights by using the second sample set, until all the submodules are in a convergence state, and use a model including a plurality of submodules in the convergent state as the social text sentiment classification model,
- where the manner of freezing and unfreezing weights means that during training of a submodule, a weight of the submodule is unfrozen to train the submodule while weights of remaining submodules are frozen.

In some embodiments, on the basis of the classification model training apparatus shown in FIG. 7, the social text includes a microblog; and the sentiment classification label is used for representing a sentiment polarity of the microblog, classification of the sentiment polarity including a positive polarity, a negative polarity and a neutral.

In the classification model training apparatus provided in the foregoing embodiments, the initial classification model is trained by using the first sample set including a large quantity of weakly supervised samples, to obtain the pre-trained model. The weakly supervised sample herein is the first sample, and includes a social text and an emoticon label corresponding to the social text. By using such a characteristic that the emoticon carried in the social text can represent a sentiment classification of the social text to some extent, the emoticon carried in the social text is directly used as the sentiment classification label corresponding to the social text, and it is unnecessary to add a sample label manually. After the training of the pre-trained model is completed, further, the pre-trained model is further optimally trained by using the second sample set including a small quantity of supervised samples. The supervised sample herein is the second sample, and includes a social text and a manually added sentiment classification label corresponding to the social text, so as to obtain the social text sentiment classification model that uses a social text as an input, and uses a sentiment class probability distribution corresponding to the social text as an output. In this way, the model is trained by combining a large quantity of weakly supervised samples with a small quantity of supervised samples, to ensure that the social text sentiment classification model with better model performance is trained without increasing costs of manual sample labeling, that is, trained by using a small quantity of manually labeled samples.

For the classification method described above, this application further provides a corresponding classification apparatus, so that the classification method can be applied and implemented in practice.

Figure 10:
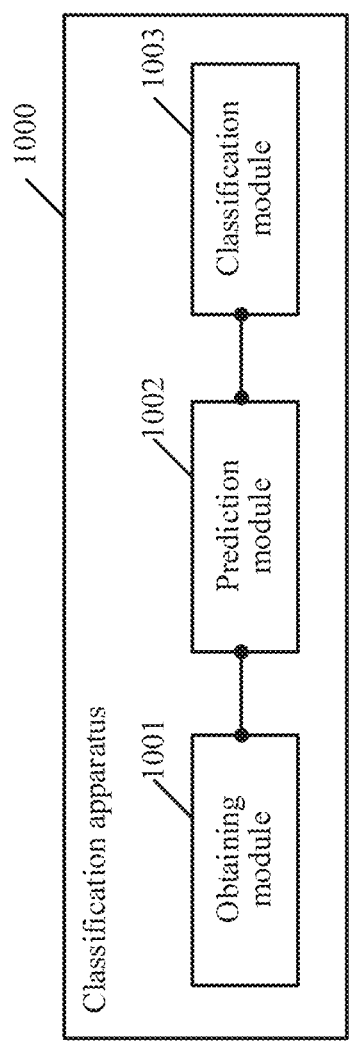
FIG. 10 is a schematic structural diagram of a classification apparatus according to an embodiment of this application.

FIG. 10 is a schematic structural diagram of a classification apparatus 1000 corresponding to the foregoing classification method shown in FIG. 5. The classification apparatus 1000 includes:

- an obtaining module 1001, configured to obtain a social text;

a prediction module 1002, configured to predict sentiments of the social text by using a pre-trained social text sentiment classification model, to obtain a sentiment class probability distribution corresponding to the social text, the social text sentiment classification model being obtained through training according to the foregoing classification model training method shown in FIG. 2, and a classification module 1003, configured to determine a sentiment class of the social text according to the sentiment class probability distribution corresponding to the social text.

Figure 11:
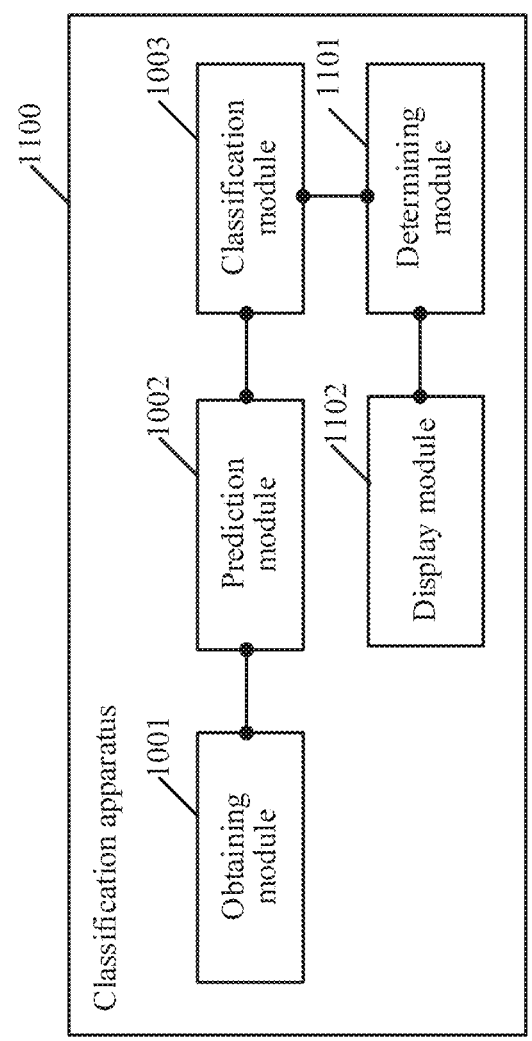
FIG. 11 is a schematic structural diagram of another classification apparatus according to an embodiment of this application.

In some embodiments, on the basis of the classification apparatus shown in FIG. 10, FIG. 11 is a schematic structural diagram of another classification apparatus 1100 according to an embodiment of this application. In the apparatus:

The obtaining module 1001 is specifically configured to obtain a chat text inputted through a chat interface as a social text.

The apparatus further includes:

a determining module 1101, configured to determine a reply content matching the sentiment class of the social text and the social text; and a display module 1102, configured to display the reply content on the chat interface.

Figure 12:
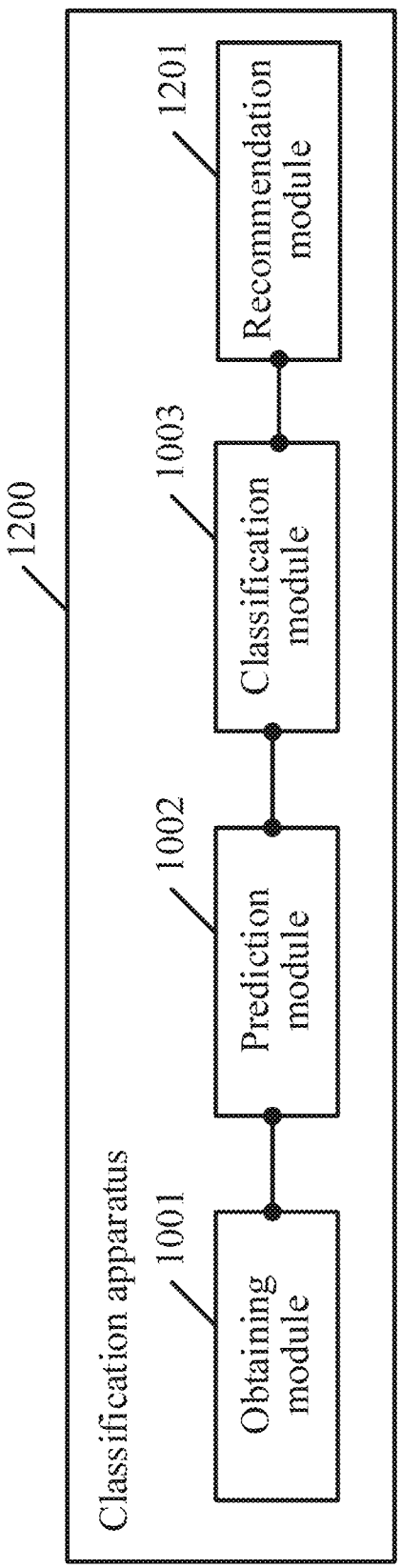
FIG. 12 is a schematic structural diagram of still another classification apparatus according to an embodiment of this application.

In some embodiments, on the basis of the classification apparatus shown in FIG. 10, FIG. 12 is a schematic structural diagram of another classification apparatus 1200 according to an embodiment of this application. In the apparatus:

The obtaining module 1001 is specifically configured to: obtain an object comment text of a specified user as a social text.

The apparatus further includes:

a recommendation module 1201, configured to recommend an object for the specified user according to the sentiment class of the social text.

Figure 13:
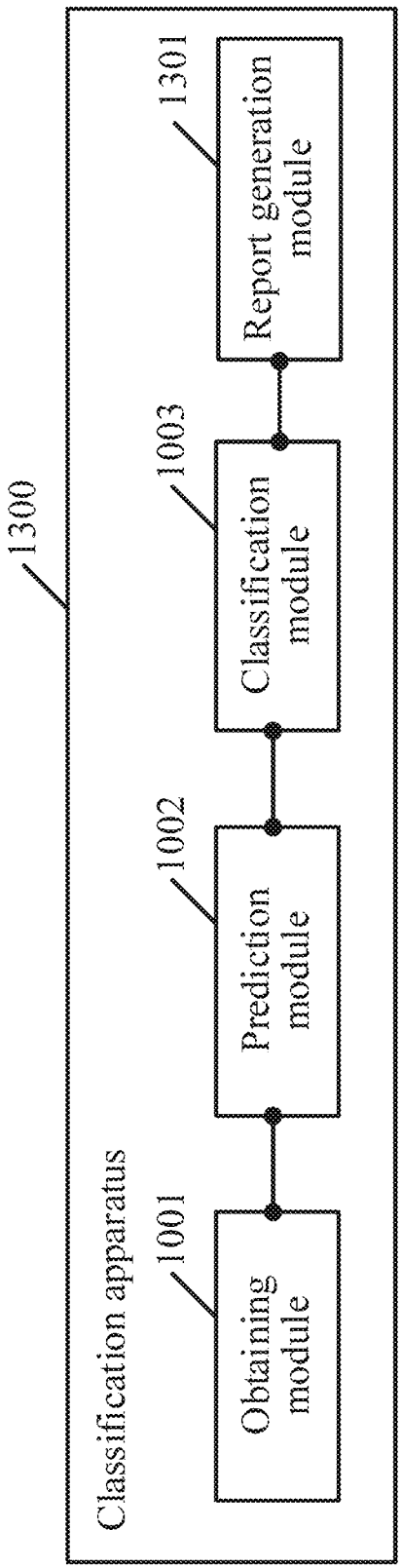
FIG. 13 is a schematic structural diagram of yet another classification apparatus according to an embodiment of this application.

In some embodiments, on the basis of the classification apparatus shown in FIG. 10, FIG. 13 is a schematic structural diagram of another classification apparatus 1300 according to an embodiment of this application. In the apparatus:

the obtaining module 1001 is specifically configured to obtain social texts related to a specified product.

The apparatus further includes:

a report generation module 1301, configured to generate a public opinion report of the specified product according to respective sentiment classes of the social texts related to the specified product.

In the foregoing classification apparatus, the obtained social text is processed by using the social text sentiment classification model obtained through training based on the classification model training method shown in FIG. 2, and the sentiment class of the obtained social text is correspondingly determined. The foregoing social text sentiment classification model is trained by using a large quantity of weakly supervised samples and a small quantity of supervised samples, and has good model performance. Therefore, the sentiment class determined for the social text by using the social text sentiment classification model is accurate.

Figure 14:
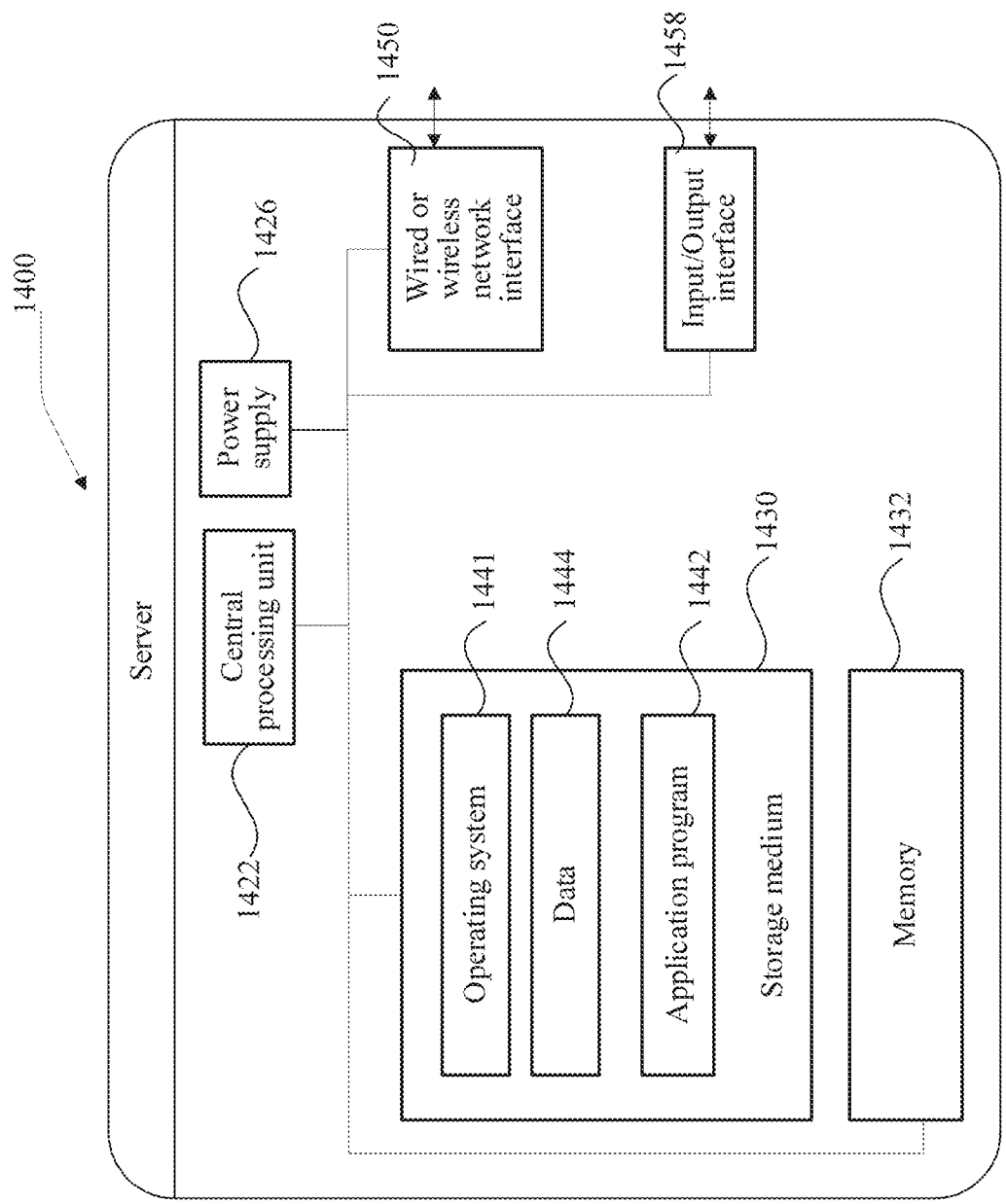
FIG. 14 is a schematic structural diagram of a server according to an embodiment of this application.

This application further provides a device for training a classification model. The device may be specifically a server. FIG. 14 is a schematic structural diagram of a server for training a classification model according to an embodiment of the present invention. The server 1400 may vary greatly due to different configurations or performance, and may include one or more central processing units (CPUs) 1422 (for example, one or more processors) and a memory 1432, and one or more storage media 1430 (for example, one or more mass storage devices) that store an application program 1442 or data 1444. The memory 1432 and the storage medium 1430 may implement transient storage or permanent storage. The program stored in the storage medium 1430 may include one or more modules (not shown in the figure), and each module may include a series of instruction operations on the server. Further, the CPU 1422 may be configured to communicate with the storage medium 1430, and perform, on the server 1400, the series of instruction operations in the storage medium 1430.

The server 1400 may further include one or more power supplies 1426, one or more wired or wireless network interfaces 1450, one or more input/output interfaces 1458, and/or one or more operating systems 1441 such as Windows Server™, Mac OS XT™, Unix™, Linux™, or FreeBSD™.

The steps performed by the server in the foregoing embodiment may be based on the server structure shown in FIG. 14.

The CPU 1422 is configured to perform the following steps:

training an initial classification model by using a first sample set, to obtain a pre-trained model, the first sample set including first samples, the first sample including a social text and an emoticon label corresponding to the social text; and training the pre-trained model by using a second sample set, to obtain a social text sentiment classification model, the social text sentiment classification model using a social text as an input and using a sentiment class probability distribution corresponding to the social text as an output, the second sample set including second samples, the second sample including a social text and a sentiment classification label corresponding to the social text.

In a possible implementation, the CPU 1422 may be further configured to perform the following steps:

acquiring a plurality of social texts, and generating a social text set, the social texts including emoticons;

determining, for each emoticon in the social text set, a sentiment ability value of the emoticon according to a number of times the emoticon occurs and a number of times the emoticon co-occurs with each sentiment word in a sentiment dictionary;

determining, for each social text in the social text set, an emoticon with the highest sentiment ability value included in the social text as an emoticon label corresponding to the social text; and generating the first sample set according to the social texts and the emoticon labels corresponding to the social texts in the social text set.

In a possible implementation, the CPU 1422 may be further configured to perform the following steps:

extracting social texts corresponding to different emoticons from the social text set based on a principle that quantities of social texts corresponding to different emoticons are the same; and generating the first sample set according to the extracted social texts and emoticon labels corresponding to the extracted social texts.

In a possible implementation, the CPU 1422 may be further configured to perform the following steps:

sorting the emoticons according to a descending order of the sentiment ability values of the emoticons, and selecting top M emoticons from the social text set as target emoticons, M being a positive integer; and the determining an emoticon with the highest sentiment ability value included in the social text as an emoticon label corresponding to the social text includes:

determining a target emoticon with the highest sentiment ability value in the social text as the emoticon label corresponding to the social text.

In a possible implementation, the initial classification model includes a word embedding layer, a convolutional layer, at least one feature extraction layer, and a classification layer; and the feature extraction layer includes a plurality of convolutional layers and one pooling layer, and each convolutional layer is connected to all subsequent convolutional layers.

The CPU 1422 may be further configured to perform the following steps:

performing functional modularization processing on the pre-trained model, to obtain a plurality of submodules, each submodule including at least one computing layer; and sequentially training the submodule in a manner of freezing and unfreezing weights by using the second sample set, until all the submodules are in a convergence state, and using a model including a plurality of submodules in the convergent state as the social text sentiment classification model, where the manner of freezing and unfreezing weights means that during training of a submodule, a weight of the submodule is unfrozen to train the submodule while weights of remaining submodules are frozen.

In a possible implementation, the social text includes a microblog; and the sentiment classification label is used for representing a sentiment polarity of the microblog, classification of the sentiment polarity including a positive polarity, a negative polarity and a neutral.

In addition, this application further provides a server for classification. The server has the similar structure as the foregoing server shown in FIG. 14. The CPU is configured to perform the following steps:

obtaining a social text;

obtaining a sentiment class probability distribution corresponding to the social text according to the social text by using a social text sentiment classification model, the social text sentiment classification model being obtained through training according to the foregoing method shown in FIG. 2; and determining a sentiment class of the social text according to the sentiment class probability distribution corresponding to the social text.

In a possible implementation, the CPU may be further configured to perform the following steps:

obtaining a chat text inputted through a chat interface as a social text.

The method further includes:

determining a reply content matching the sentiment class of the social text and the social text; and displaying the reply content on the chat interface.

In a possible implementation, the CPU may be further configured to perform the following steps:

obtaining an object comment text of a specified user as a social text.

The method further includes:

recommending an object to the specified user according to the sentiment class of the social text.

In a possible implementation, the CPU may be further configured to perform the following steps:

obtaining social texts related to a specified product; and

The method further includes:

generating a public opinion report of the specified product according to respective sentiment classes of the social texts related to the specified product.

Figure 15:
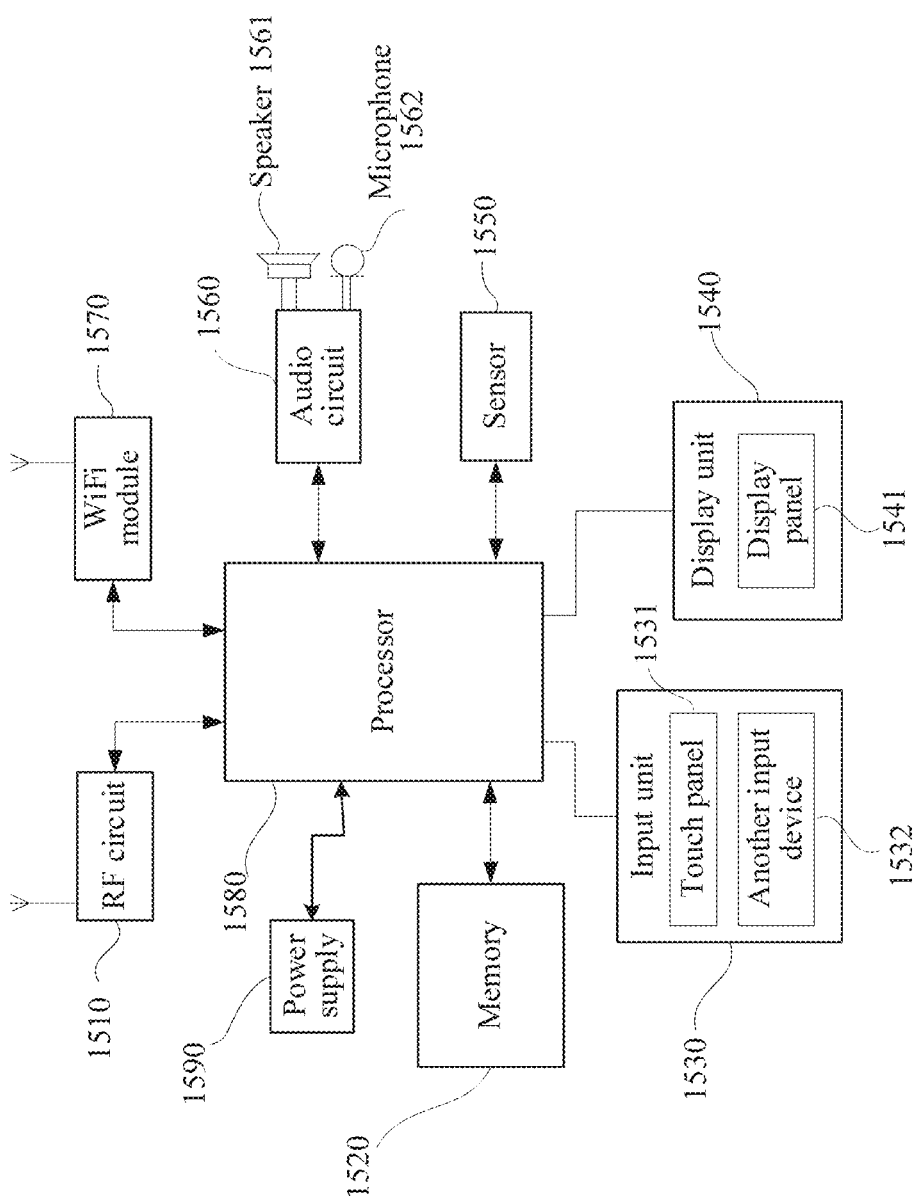
FIG. 15 is a schematic structural diagram of a terminal device according to an embodiment of this application.

The embodiments of this application further provide another device for training the classification model. The device may be a terminal device. As shown in FIG. 15, for ease of description, only parts related to the embodiments of this application are shown. For specific technical details that are not disclosed, refer to the method part in the embodiments of this application. The terminal may be any terminal device including a mobile phone, a tablet computer, a personal digital assistant (PDA), a point of sales (POS), and an on-board computer. An example in which the terminal is a mobile phone is used.

FIG. 15 is a block diagram of a part of a structure of a mobile phone related to a terminal according to an embodiment of this application. Referring to FIG. 15, the mobile phone includes components such as a radio frequency (RF) circuit 1510, a memory 1520, an input unit 1530, a display unit 1540, a sensor 1550, an audio circuit 1560, a wireless fidelity (Wi-Fi) module 1570, a processor 1580, and a power supply 1590. Persons skilled in the art may understand that the structure of the mobile phone shown in FIG. 15 does not constitute a limitation on the mobile phone, and the mobile phone may include more components or fewer components than those shown in the figure, or some components may be combined, or a different component deployment may be used.

In this embodiment of this application, the processor 1580 included in the terminal further has the following functions:

training an initial classification model by using a first sample set, to obtain a pre-trained model, the first sample set including first samples, the first sample including a social text and an emoticon label corresponding to the social text; and training the pre-trained model by using a second sample set, to obtain a social text sentiment classification model, the social text sentiment classification model using a social text as an input and using a sentiment class probability distribution corresponding to the social text as an output, the second sample set including second samples, the second sample including a social text and a sentiment classification label corresponding to the social text.

In some embodiments, the processor 1580 may further perform method steps of any specific implementation of the classification model training method in the embodiments of this application.

In addition, this application further provides a terminal device for classification. The terminal device has the similar structure as the foregoing terminal device shown in FIG. 15. The processor is configured to perform the following steps:

obtaining a social text;

obtaining a sentiment class probability distribution corresponding to the social text according to the social text by using a social text sentiment classification model, the social text sentiment classification model being obtained through training according to the foregoing method shown in FIG. 2; and determining a sentiment class of the social text according to the sentiment class probability distribution corresponding to the social text.

In some embodiments, the processor may further perform method steps of any specific implementation of the classification method in the embodiments of this application.

The embodiments of this application further provide a computer-readable storage medium, configured to store program code, the program code being used for performing the following classification model training steps:

training an initial classification model by using a first sample set, to obtain a pre-trained model, the first sample set including first samples, the first sample including a social text and an emoticon label corresponding to the social text; and training the pre-trained model by using a second sample set, to obtain a social text sentiment classification model, the social text sentiment classification model using a social text as an input and using a sentiment class probability distribution corresponding to the social text as an output, the second sample set including a second sample, the second sample including a social text and a sentiment classification label corresponding to the social text.

In a possible implementation, the program code may be used for performing the following steps:

extracting social texts corresponding to different emoticons from the social text set based on a principle that quantities of social texts corresponding to different emoticons are the same; and generating the first sample set according to the extracted social texts and emoticon labels corresponding to the extracted social texts.

In a possible implementation, the program code may be used for performing the following steps:

sorting the emoticons according to a descending order of the sentiment ability values of the emoticons, and selecting top M emoticons from the social text set as target emoticons, M being a positive integer; and the determining an emoticon with the highest sentiment ability value included in the social text as an emoticon label corresponding to the social text includes:

determining a target emoticon with the highest sentiment ability value in the social text as the emoticon label corresponding to the social text.

In a possible implementation, the initial classification model includes a word embedding layer, a convolutional layer, at least one feature extraction layer, and a classification layer; and the feature extraction layer includes a plurality of convolutional layers and one pooling layer, and each convolutional layer is connected to all subsequent convolutional layers.

The program code may be used for performing the following steps:

performing functional modularization processing on the pre-trained model, to obtain a plurality of submodules, each submodule including at least one computing layer; and sequentially training the submodule in a manner of freezing and unfreezing weights by using the second sample set, until all the submodules are in a convergence state, and using a model including a plurality of submodules in the convergent state as the social text sentiment classification model, where the manner of freezing and unfreezing weights means that during training of a submodule, a weight of the submodule is unfrozen to train the submodule while weights of remaining submodules are frozen.

In a possible implementation, the social text includes a microblog; and the sentiment classification label is used for representing a sentiment polarity of the microblog, classification of the sentiment polarity including a positive polarity, a negative polarity and a neutral.

In a possible implementation, the program code may be further used for performing the following classification steps:

obtaining a social text;

obtaining a sentiment class probability distribution corresponding to the social text according to the social text by using a social text sentiment classification model, the social text sentiment classification model being obtained through training according to the foregoing method shown in FIG. 2; and determining a sentiment class of the social text according to the sentiment class probability distribution corresponding to the social text.

In a possible implementation, the program code may be used for performing the following steps:

obtaining a chat text inputted through a chat interface as a social text.

The method further includes:

determining a reply content matching the sentiment class of the social text and the social text; and displaying the reply content on the chat interface.

In a possible implementation, the program code may be used for performing the following steps:

obtaining an object comment text of a specified user as a social text.

The method further includes:

recommending an object to the specified user according to the sentiment class of the social text.

In a possible implementation, the program code may be used for performing the following steps:

obtaining social texts related to a specified product; and

The method further includes:

generating a public opinion report of the specified product according to respective sentiment classes of the social texts related to the specified product.

The embodiments of this application further provide a computer program product including instructions. When the computer program product runs on a computer, the computer performs any implementation of the classification model training method in the foregoing embodiments, or any implementation of the classification method.

Person skilled in the art may clearly understand that, for convenience and brevity of the description, for a detailed working process of the foregoing system, apparatus, and unit, refer to a corresponding process in the foregoing method embodiments, and details are not described herein again.

In the several embodiments provided in this application, the disclosed system, apparatus, and method may be implemented in other manners. For example, the described apparatus embodiments are only exemplary. For example, the division of the units is only a logical function division and may be other divisions during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate components may or may not be physically separated, and the components displayed as units may or may not be physical units, that is, may be located in one position or may be distributed on a plurality of network units. Some or all of the units can be selected according to actual requirements to achieve the objectives of the solutions in the embodiments.

In addition, functional units in the embodiments of this application may be integrated into one processing unit, or each of the units may exist physically separated, or two or more units are integrated into one unit. The foregoing integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are only provided for describing the technical solutions of this application, but not intended to limit this application. Although this application has been described in detail with reference to the foregoing embodiments, persons of ordinary skill in the art understands that they may still make modifications to the technical solutions described in the foregoing embodiments or make equivalent replacements to some technical features thereof, and such modifications or replacements do not cause the essence of corresponding technical solutions to depart from the spirit and scope of the technical solutions in the embodiments of this application.

What is claimed is:

1. A method performed at a computing device having one or more processors and memory storing a plurality of computer-readable instructions to be executed by the one or more processors, the method comprising:
    training an initial classification model by using a first sample set, to obtain a pre-trained model, the first sample set comprising a quantity of weakly supervised first samples, each first sample comprising a first social text and an emoticon label in the first social text;
    training the pre-trained model by using a second sample set, to obtain a social text sentiment classification model, the second sample set comprising a quantity of supervised second samples, each second sample comprising a second social text and a manually-added sentiment classification label corresponding to the second social text; and
    applying a target social text to the social text sentiment classification model as an input to obtain a sentiment class probability distribution corresponding to the target social text as an output.

2. The method according to claim 1, wherein the first sample set is generated by:
    acquiring a plurality of social texts, and generating a social text set, the plurality of social texts comprising emoticons;
    determining, for each emoticon in the social text set, a sentiment ability value of the emoticon according to a number of times the emoticon occurs in the social text set and a number of times the emoticon co-occurs with each sentiment word in a sentiment dictionary;
    determining, for each social text in the social text set, an emoticon with a highest sentiment ability value comprised in the social text as an emoticon label corresponding to the social text; and
    generating the first sample set according to the social texts and the emoticon labels corresponding to the social texts in the social text set.

3. The method according to claim 2, wherein the generating the first sample set according to the social texts and the emoticon labels corresponding to the social texts in the social text set comprises:
    extracting social texts corresponding to different emoticons from the social text set based on a principle that quantities of social texts corresponding to different emoticons are the same; and
    generating the first sample set according to the extracted social texts and emoticon labels corresponding to the extracted social texts.

4. The method according to claim 2, further comprising:
    after determining the sentiment ability value of the emoticon, selecting, according to a descending order of the sentiment ability values of the emoticons, top M emoticons from the social text set as target emoticons, M being a positive integer; and
    the determining an emoticon with a highest sentiment ability value comprised in the social text as an emoticon label corresponding to the social text comprises:
        determining a target emoticon with the highest sentiment ability value in the social text as the emoticon label corresponding to the social text.

5. The method according to claim 1, wherein the initial classification model comprises a word embedding layer, a convolutional layer, at least one feature extraction layer, and a classification layer, and the feature extraction layer comprises a plurality of convolutional layers and one pooling layer, and each convolutional layer is connected to all subsequent convolutional layers; and
    the training the pre-trained model by using a second sample set, to obtain a social text sentiment classification model comprises:
        performing functional modularization processing on the pre-trained model, to obtain a plurality of submodules, each submodule comprising at least one computing layer; and
        sequentially training the submodule in a manner of freezing and unfreezing weights by using the second sample set, until all the submodules are in a convergence state, and using a model comprising a plurality of submodules in the convergent state as the social text sentiment classification model,
        wherein the manner of freezing and unfreezing weights means that during training of a submodule, a weight of the submodule is unfrozen to train the submodule while weights of remaining submodules are frozen.

6. The method according to claim 1, wherein the target social text comprises a microblog, and the sentiment classification label is used for representing a sentiment polarity of the microblog, classes of the sentiment polarity comprising a positive polarity, a negative polarity and a neutral.

7. The method according to claim 1, further comprising:
    determining a sentiment class of the target social text according to the sentiment class probability distribution corresponding to the target social text.

8. The method according to claim 7, wherein the target social text is a chat text obtained through a chat interface and the method further comprises:
- determining a reply content matching the sentiment class of the target social text; and
- displaying the reply content on the chat interface.

9. The method according to claim 7, wherein the target social text is an object comment text by a specified user and the method further comprises:
- recommending an object to the specified user according to the sentiment class of the target social text.

10. The method according to claim 7, wherein the target social text is related to a specified product and the method further comprises:
- generating a public opinion report of the specified product according to respective sentiment classes of the target social text related to the specified product.

11. A computing device, comprising a processor and a memory,
- the memory being configured to store a plurality of computer-readable instructions; and
- the processor being configured to perform a plurality of operations according to the plurality of computer-readable instructions, the plurality of operations including:
  - training an initial classification model by using a first sample set, to obtain a pre-trained model, the first sample set comprising a quantity of weakly supervised first samples, each first sample comprising a first social text and an emoticon label in the first social text;
  - training the pre-trained model by using a second sample set, to obtain a social text sentiment classification model, the second sample set comprising a quantity of supervised second samples, each second sample comprising a second social text and a manually-added sentiment classification label corresponding to the second social text; and
  - applying a target social text to the social text sentiment classification model as an input to obtain a sentiment class probability distribution corresponding to the target social text as an output.

12. The computing device according to claim 11, wherein the first sample set is generated by:
- acquiring a plurality of social texts, and generating a social text set, the social texts comprising emoticons;
- determining a sentiment ability value of each emoticon according to a number of times the emoticon occurs in the social text set and a number of times the emoticon co-occurs with each sentiment word in a sentiment dictionary;
- determining, based on the social texts in the social text set and the sentiment ability values of the emoticons, an emoticon with the highest sentiment ability value comprised in the social text as an emoticon label corresponding to the social text; and
- generating the first sample set according to the social texts and the emoticon labels corresponding to the social texts in the social text set.

13. The computing device according to claim 12, wherein the generating the first sample set according to the social texts and the emoticon labels corresponding to the social texts in the social text set comprises:
- extracting social texts corresponding to different emoticons from the social text set based on a principle that quantities of social texts corresponding to different emoticons are the same; and
- generating the first sample set according to the extracted social texts and emoticon labels corresponding to the extracted social texts.

14. The computing device according to claim 12, wherein the plurality of operations further comprise:
- after determining the sentiment ability value of the emoticon, selecting, according to a descending order of the sentiment ability values of the emoticons, top M emoticons from the social text set as target emoticons, M being a positive integer; and
- determining a target emoticon with the highest sentiment ability value in the social text as the emoticon label corresponding to the social text.

15. The computing device according to claim 11, wherein the initial classification model comprises a word embedding layer, a convolutional layer, at least one feature extraction layer, and a classification layer, and the feature extraction layer comprises a plurality of convolutional layers and one pooling layer, and each convolutional layer is connected to all subsequent convolutional layers; and
- the processor is configured to perform the following operations according to instructions in the program code:
  - performing functional modularization processing on the pre-trained model, to obtain a plurality of submodules, each submodule comprising at least one computing layer; and
  - sequentially training the submodule in a manner of freezing and unfreezing weights by using the second sample set, until all the submodules are in a convergence state, and using a model comprising a plurality of submodules in the convergent state as the social text sentiment classification model,
- wherein the manner of freezing and unfreezing weights means that during training of a submodule, a weight of the submodule is unfrozen to train the submodule while weights of remaining submodules are frozen.

16. The computing device according to claim 11, wherein the target social text comprises a microblog, and the sentiment classification label is used for representing a sentiment polarity of the microblog, classes of the sentiment polarity comprising a positive polarity, a negative polarity and a neutral.

17. The computing device according to claim 11, wherein the plurality of operations further comprise:
- determining a sentiment class of the target social text according to the sentiment class probability distribution corresponding to the target social text.

18. A non-transitory computer-readable storage medium storing a plurality of computer-readable instructions that, when executed by a processor of a computing device, cause the computing device to perform a plurality of operations including:
- training an initial classification model by using a first sample set, to obtain a pre-trained model, the first sample set comprising a quantity of weakly supervised first samples, each first sample comprising a first social text and an emoticon label in the first social text;
- training the pre-trained model by using a second sample set, to obtain a social text sentiment classification model, the second sample set comprising a quantity of supervised second samples, each second sample comprising a second social text and a manually-added sentiment classification label corresponding to the second social text; and
- applying a target social text to the social text sentiment classification model as an input to obtain a sentiment class probability distribution corresponding to the target social text as an output.

19. The non-transitory computer-readable storage medium according to claim 18, wherein the first sample set is generated by:
   acquiring a plurality of social texts, and generating a social text set, the social texts comprising emoticons;
   determining a sentiment ability value of each emoticon according to a number of times the emoticon occurs in the social text set and a number of times the emoticon co-occurs with each sentiment word in a sentiment dictionary;
   determining, based on the social texts in the social text set and the sentiment ability values of the emoticons, an emoticon with the highest sentiment ability value comprised in the social text as an emoticon label corresponding to the social text; and
   generating the first sample set according to the social texts and the emoticon labels corresponding to the social texts in the social text set.

20. The non-transitory computer-readable storage medium according to claim 19, wherein the generating the first sample set according to the social texts and the emoticon labels corresponding to the social texts in the social text set comprises:
   extracting social texts corresponding to different emoticons from the social text set based on a principle that quantities of social texts corresponding to different emoticons are the same; and
   generating the first sample set according to the extracted social texts and emoticon labels corresponding to the extracted social texts.

* * * * *